United States Patent
Lee et al.

(10) Patent No.: US 12,375,852 B2
(45) Date of Patent: Jul. 29, 2025

(54) ELECTRONIC DEVICE AND MULTICHANNEL AUDIO OUTPUT METHOD USING SAME

(71) Applicant: Samsung Electronics Co., Ltd., Suwon-si (KR)

(72) Inventors: Min Lee, Suwon-si (KR); Jinyoung Kim, Suwon-si (KR); Hanki Yoon, Suwon-si (KR); Soonkyu Lee, Suwon-si (KR); Jongkwang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 18/183,477

(22) Filed: Mar. 14, 2023

(65) Prior Publication Data

US 2023/0217169 A1     Jul. 6, 2023

Related U.S. Application Data

(63) Continuation of application No. PCT/KR2021/016995, filed on Nov. 18, 2021.

(30) Foreign Application Priority Data

Dec. 3, 2020  (KR) .......................... 10-2020-0167462
Jan. 29, 2021 (KR) .......................... 10-2021-0013650

(51) Int. Cl.
*H04R 3/12*     (2006.01)
*H04R 5/02*     (2006.01)
(Continued)

(52) U.S. Cl.
CPC ................ *H04R 3/12* (2013.01); *H04R 5/02* (2013.01); *H04R 5/04* (2013.01); *H04S 3/008* (2013.01);
(Continued)

(58) Field of Classification Search
None
See application file for complete search history.

(56) References Cited

U.S. PATENT DOCUMENTS 8,150,079 B2 * 4/2012 Maeda ................ H04M 1/0227
                                                  381/306
8,160,259 B2    4/2012 Noguchi et al.
(Continued)

FOREIGN PATENT DOCUMENTS

CN     111580771 A  *  8/2020
JP    2006-352579 A     12/2006
(Continued)

OTHER PUBLICATIONS

English language translation of CN111580771A. (Year: 2020).*
(Continued)

*Primary Examiner* — Paul W Huber
(74) *Attorney, Agent, or Firm* — Jefferson IP Law, LLP

(57) ABSTRACT

An electronic device is provided. The electronic device includes a plurality of audio output devices and at least one processor operatively connected to the plurality of audio output devices, wherein the at least one processor may be configured to identify orientation information of the electronic device, based on detecting an output of audio data, transmit, to each audio output device, channel information of audio data to be output by each of the plurality of audio output devices, based on the orientation information of the electronic device, and control the plurality of audio output devices so that each audio output device selects a channel and outputs audio data of the selected channel, based on the channel information.

20 Claims, 11 Drawing Sheets

(51) Int. Cl.
*H04R 5/04* (2006.01)
*H04S 3/00* (2006.01)

(52) U.S. Cl.
CPC ...... *H04R 2499/11* (2013.01); *H04R 2499/15* (2013.01); *H04S 2400/01* (2013.01)

(56) References Cited

U.S. PATENT DOCUMENTS

| | | | | |
|---|---|---|---|---|
| 8,600,084 | B1* | 12/2013 | Garrett | H04R 5/04 381/334 |
| 9,092,197 | B2* | 7/2015 | Sim | G06F 1/1688 |
| 9,136,798 | B2 | 9/2015 | Moon et al. | |
| 10,089,066 | B2 | 10/2018 | Kang et al. | |
| 10,860,274 | B2 | 12/2020 | Son et al. | |
| 11,134,356 | B2 | 9/2021 | Usui et al. | |
| 11,330,372 | B2* | 5/2022 | Sun | H04R 5/04 |
| 12,041,437 | B2* | 7/2024 | So | H04R 5/02 |
| 2001/0011993 | A1* | 8/2001 | Saarinen | H04R 5/04 345/156 |
| 2011/0002487 | A1* | 1/2011 | Panther | H04R 5/04 381/300 |
| 2011/0316768 | A1* | 12/2011 | McRae | G06F 3/165 381/80 |
| 2012/0020479 | A1 | 1/2012 | Zhang | |
| 2013/0038726 | A1* | 2/2013 | Kim | H04R 3/12 348/143 |
| 2014/0219483 | A1 | 8/2014 | Hong | |
| 2014/0369505 | A1 | 12/2014 | Lee et al. | |
| 2017/0078824 | A1 | 3/2017 | Heo | |
| 2019/0158957 | A1 | 5/2019 | Breebaart et al. | |
| 2020/0153952 | A1 | 5/2020 | Liu et al. | |
| 2020/0267847 | A1 | 8/2020 | Lee et al. | |
| 2021/0321209 | A1* | 10/2021 | So | H04R 5/02 |

FOREIGN PATENT DOCUMENTS

| | | |
|---|---|---|
| JP | 2008-028693 A | 2/2008 |
| JP | 2016-100688 A | 5/2016 |
| JP | 6559382 B1 | 8/2019 |
| JP | 6795611 B2 | 12/2020 |
| KR | 10-1989-0003232 A | 4/1989 |
| KR | 20-1991-0001883 U | 1/1991 |
| KR | 20-1993-0012528 U | 6/1993 |
| KR | 20-0258287 Y1 | 12/2001 |
| KR | 20-0262156 Y1 | 3/2002 |
| KR | 10-2003-0003646 A | 1/2003 |
| KR | 10-2003-0009022 A | 1/2003 |
| KR | 20-0462127 Y1 | 8/2012 |
| KR | 10-2013-0041606 A | 4/2013 |
| KR | 10-1522002 B1 | 5/2015 |
| KR | 10-2017-0031392 A | 3/2017 |
| KR | 10-2018-0068202 A | 6/2018 |
| KR | 10-2019-0001822 A | 1/2019 |
| KR | 10-2007489 B1 | 8/2019 |
| KR | 10-2081336 B1 | 2/2020 |
| KR | 10-2020-0132016 A | 11/2020 |

OTHER PUBLICATIONS

English language translation of KR20200132016A. (Year: 2020).*
International Search Report with Written Opinion dated Feb. 28, 2022; International Appln. No. PCT/KR2021/016995.
Korean Office Action dated Dec. 11, 2024, issued in Korean Application No. 10-2021-0013650.

* cited by examiner

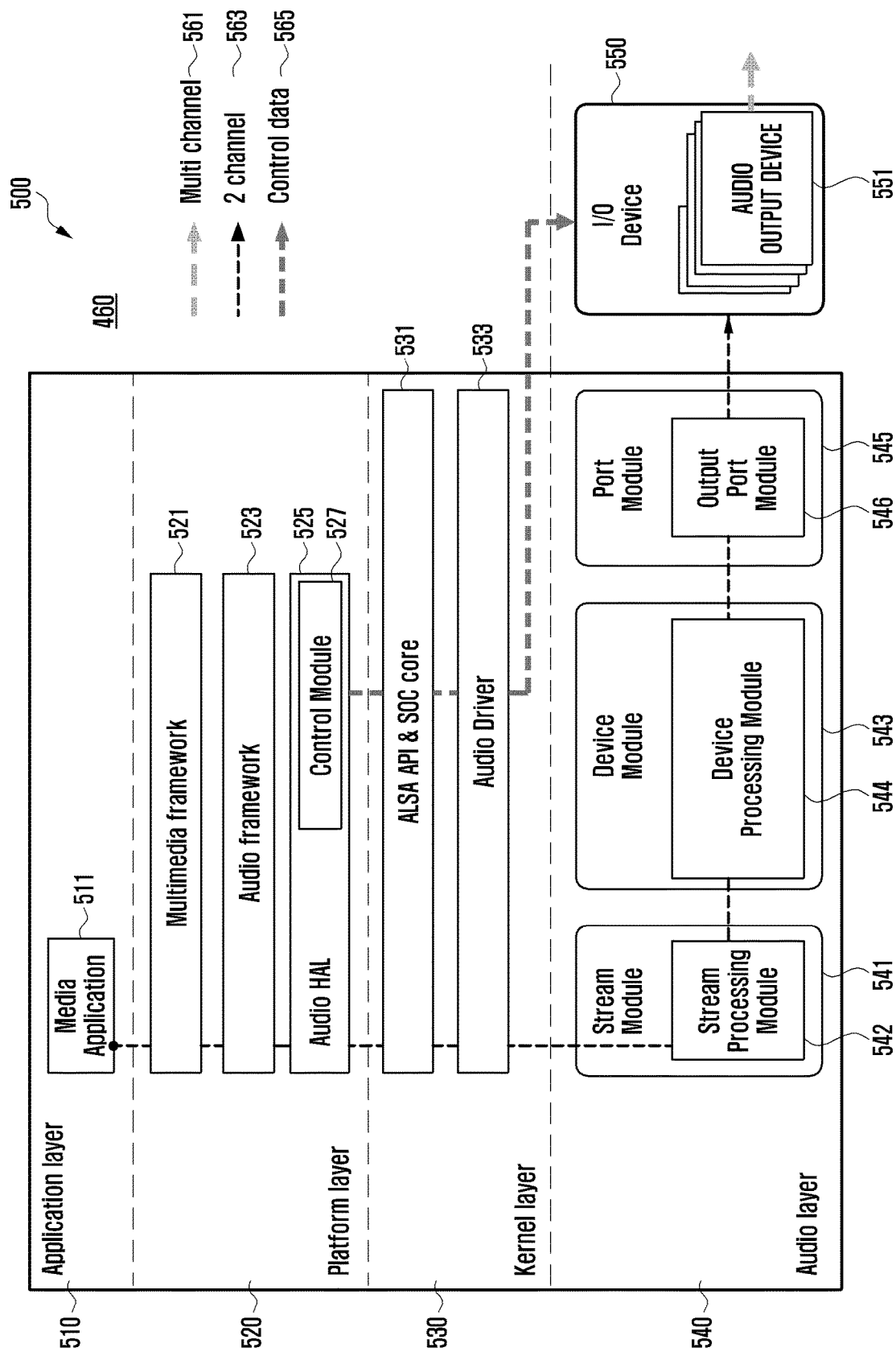

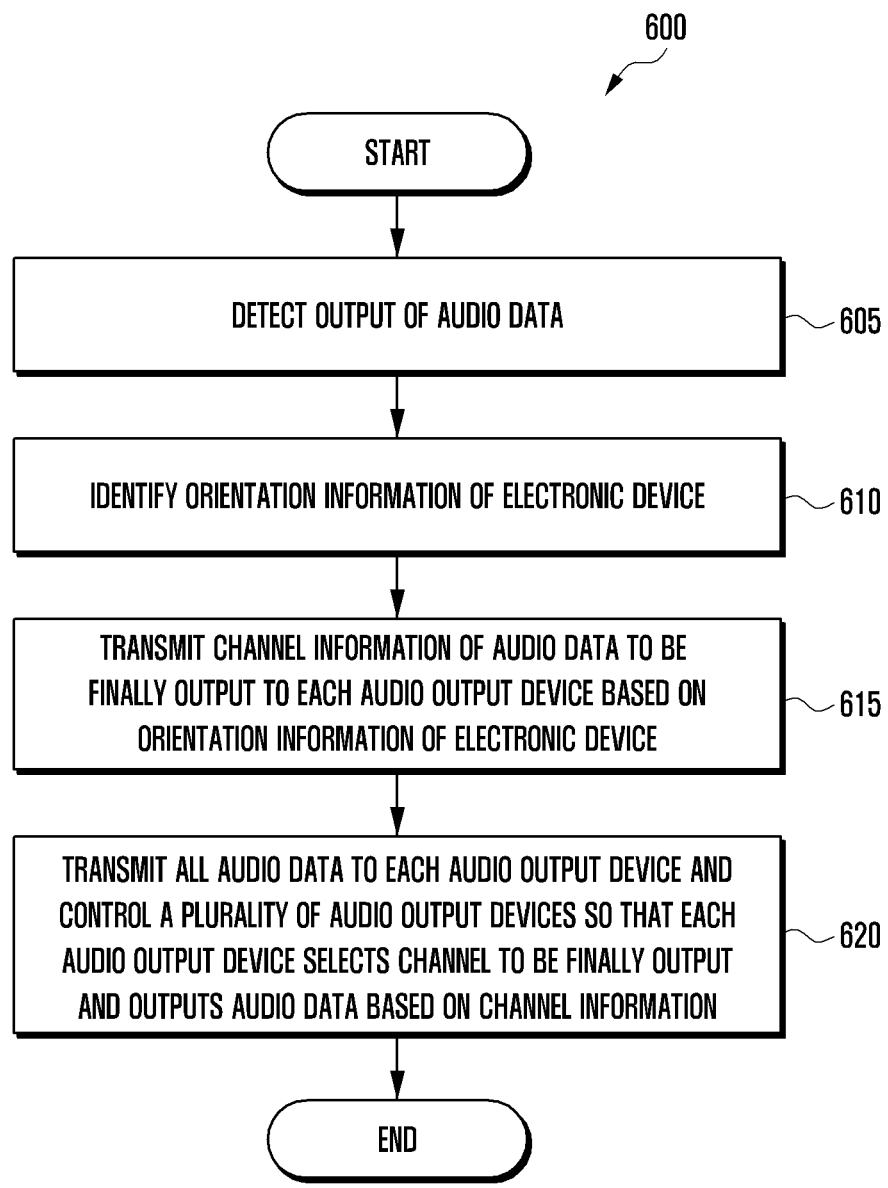

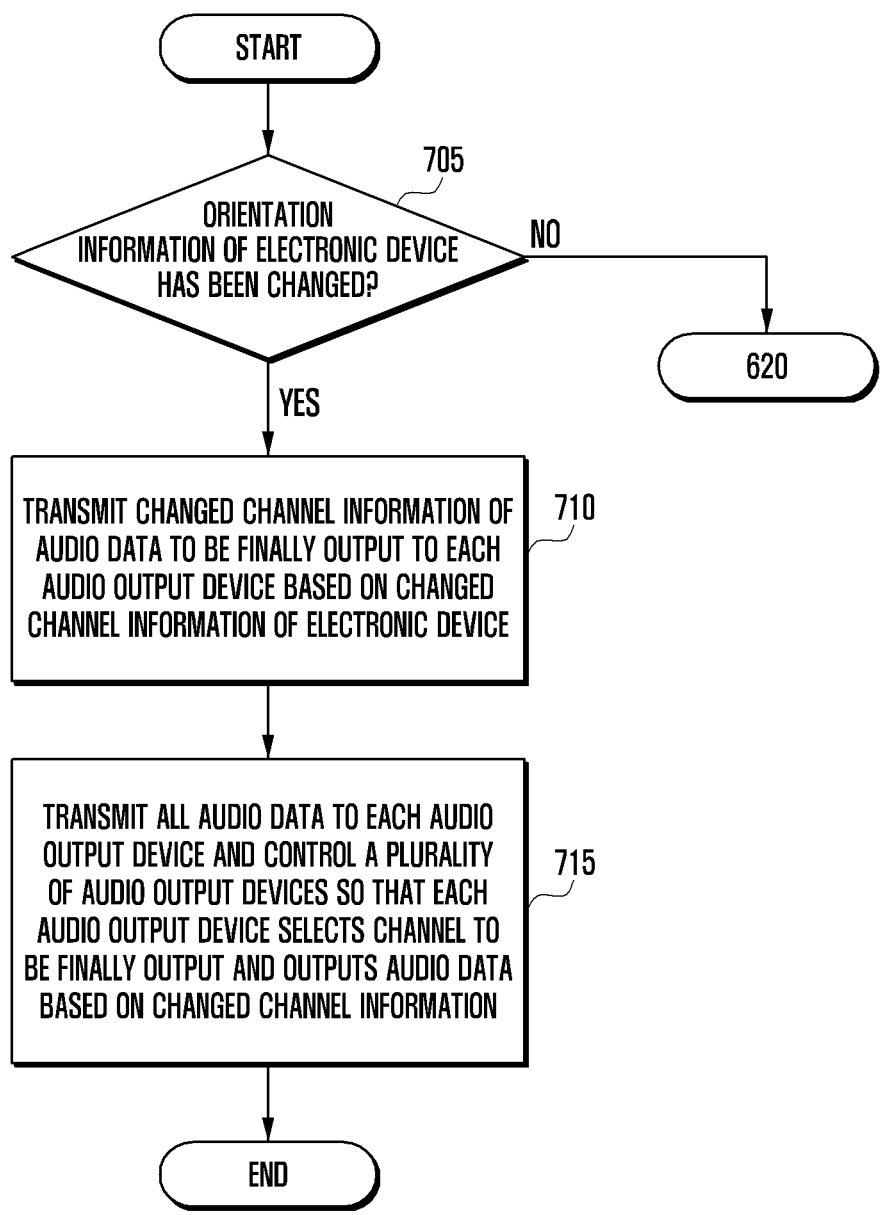

ELECTRONIC DEVICE AND MULTICHANNEL AUDIO OUTPUT METHOD USING SAME

CROSS-REFERENCE TO RELATED APPLICATION(S)

This application is a continuation application, claiming priority under § 365(c), of an International application No. PCT/KR2021/016995, filed on Nov. 18, 2021, which is based on and claims the benefit of a Korean patent application number 10-2020-0167462, filed on Dec. 3, 2020, in the Korean Intellectual Property Office, and of a Korean patent application number 10-2021-0013650, filed on Jan. 29, 2021, in the Korean Intellectual Property Office, the disclosure of each of which is incorporated by reference herein in its entirety.

BACKGROUND

1. Field

The disclosure relates to an electronic device and a method of outputting multi-channel audio using the same.

2. Description of Related Art

Electronic devices may output audio data with multi-channels using a plurality of audio output devices. For example, the electronic device generates multi-channel audio data corresponding to the number of audio output devices or generate multi-channel audio data based on the number of channels corresponding to audio data. The electronic device may output the generated multi-channel audio data through a plurality of audio output devices.

The above information is presented as background information only to assist with an understanding of the disclosure. No determination has been made, and no assertion is made, as to whether any of the above might be applicable as prior art with regard to the disclosure.

SUMMARY

A processing delay of audio data may occur due to the time required to generate audio data into multi-channel audio data to correspond to the number of audio output devices and/or the use of a buffer. For example, as a processing delay occurs in audio data (e.g., game sound, live streaming) of a content requiring real-time performance, usability of the electronic device deteriorates.

Aspects of the disclosure are to address at least the above-mentioned problems and/or disadvantages and to provide at least the advantages described below. Accordingly, an aspect of the disclosure is to provide an electronic device to transmit channel information of audio data to be output by each audio output device of the plurality of audio output devices according to orientation information thereof to each audio output device. Each audio output device of the plurality of audio output devices may output audio data of a corresponding channel based on channel information of the audio data.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of audio output devices, and at least one processor operatively connected to the plurality of audio output devices, wherein the at least one processor may be configured to identify orientation information of the electronic device based on detecting an output of audio data, to transmit channel information of audio data to be output by each of the plurality of audio output devices to each audio output device of the plurality of audio output devices based on the orientation information of the electronic device, and to control the plurality of audio output devices of the plurality of audio output devices so that each audio output device selects a channel and outputs audio data of the selected channel based on the channel information.

In accordance with another aspect of the disclosure, a method of outputting multi-channel audio of an electronic device is provided. The method includes identifying orientation information of the electronic device based on detecting an output of audio data, transmitting channel information of audio data to be output by each of the plurality of audio output devices to each audio output device of the plurality of audio output devices based on the orientation information of the electronic device, and controlling the plurality of audio output devices so that each audio output device of the plurality of audio output devices selects a channel and outputs audio data of the selected channel based on the channel information.

Each audio output device provided in the electronic device according to various embodiments of the disclosure may output audio data of a corresponding channel based on channel information of the audio data without separately processing the audio data. Accordingly, a time delay according to processing of audio data may be minimized. Further, in the case that contents such as a game and/or live streaming requiring real-time performance are reproduced, a sense of difference between audio data and video data may be resolved, thereby increasing usability of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A is a diagram illustrating a hierarchy structure of an electronic device according to an embodiment of the disclosure;

FIG. 6 is a flowchart illustrating a method of outputting multi-channel audio data according to orientation information of an electronic device according to an embodiment of the disclosure;

FIG. 7 is a flowchart illustrating a method of outputting multi-channel audio data based on a change of orientation information of an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
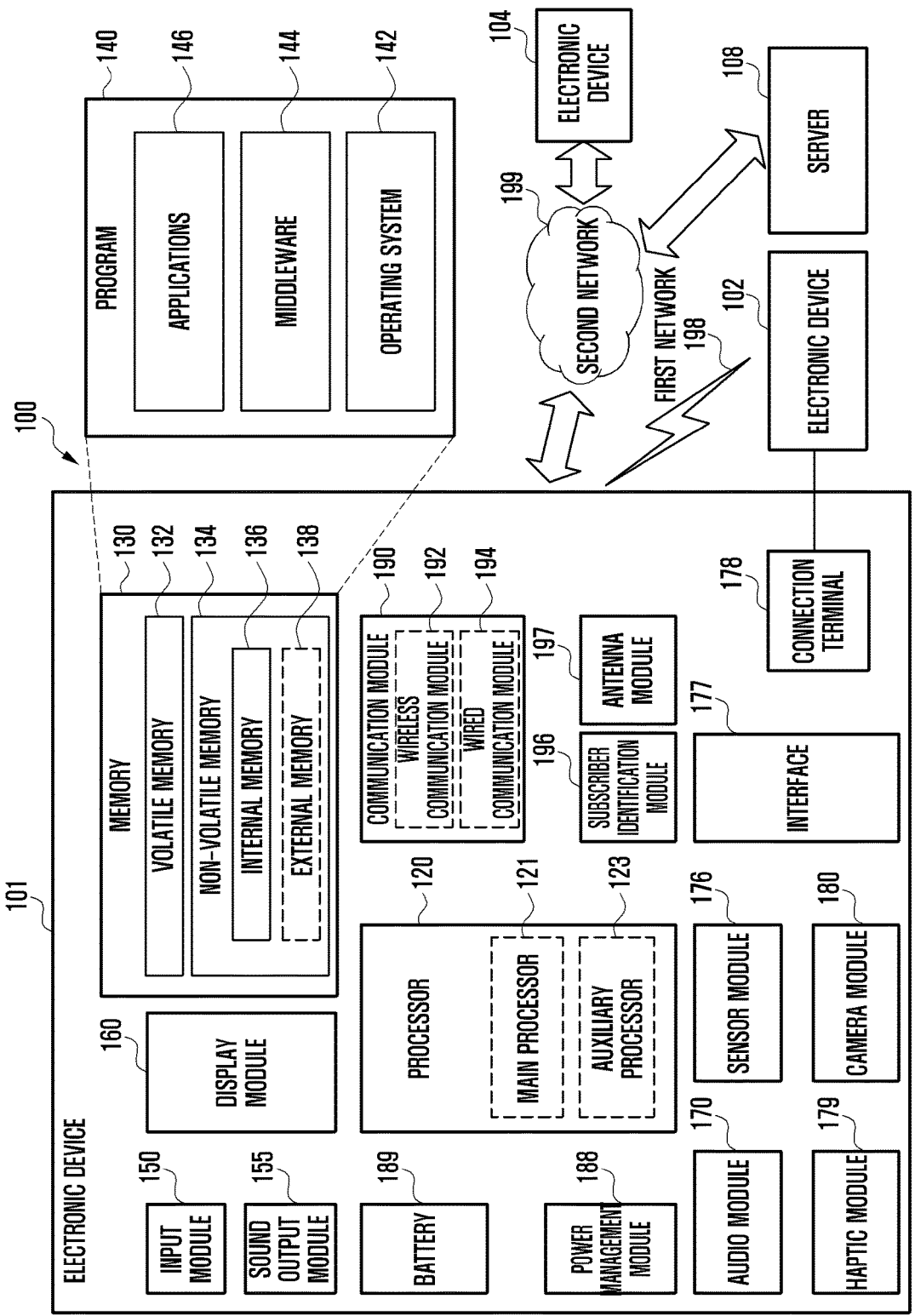
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to another embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to another embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to another embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. According to another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to another embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to another embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to another embodiment, another component (e.g., a radio frequency integrated circuit (RFIC)) other than the radiating element may be additionally formed as part of the antenna module 197.

According to various embodiments, the antenna module 197 may form mmWave antenna module. According to another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to another embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
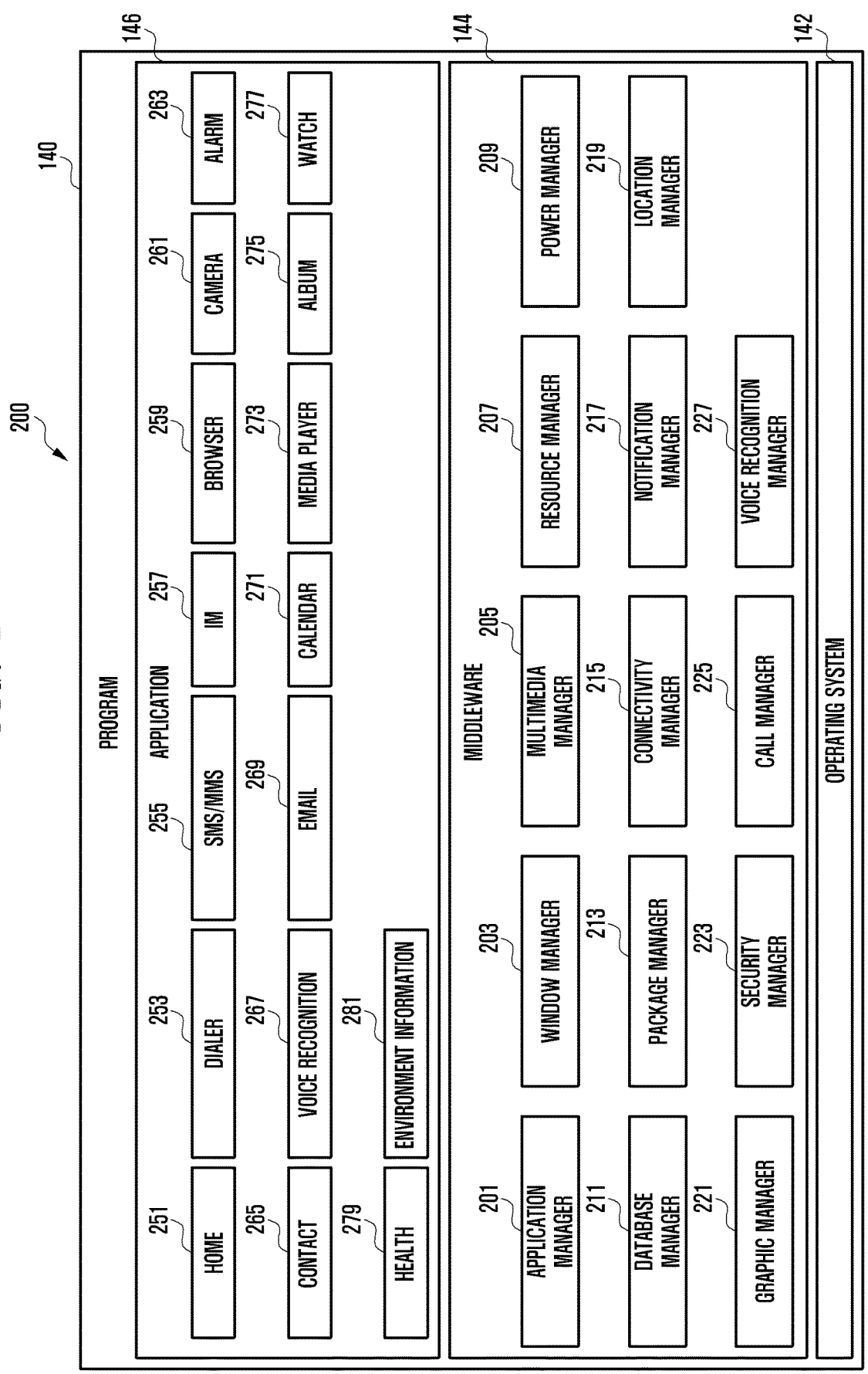
FIG. 2 is a block diagram illustrating a program according to an embodiment of the disclosure.

FIG. 2 is a block diagram illustrating the program according to an embodiment of the disclosure.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

Referring to FIG. 2, in the block diagram 200, the OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to another embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to another embodiment, the middleware 144 may dynamically delete some existing components or add new components. According to another embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to another embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the application: email 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
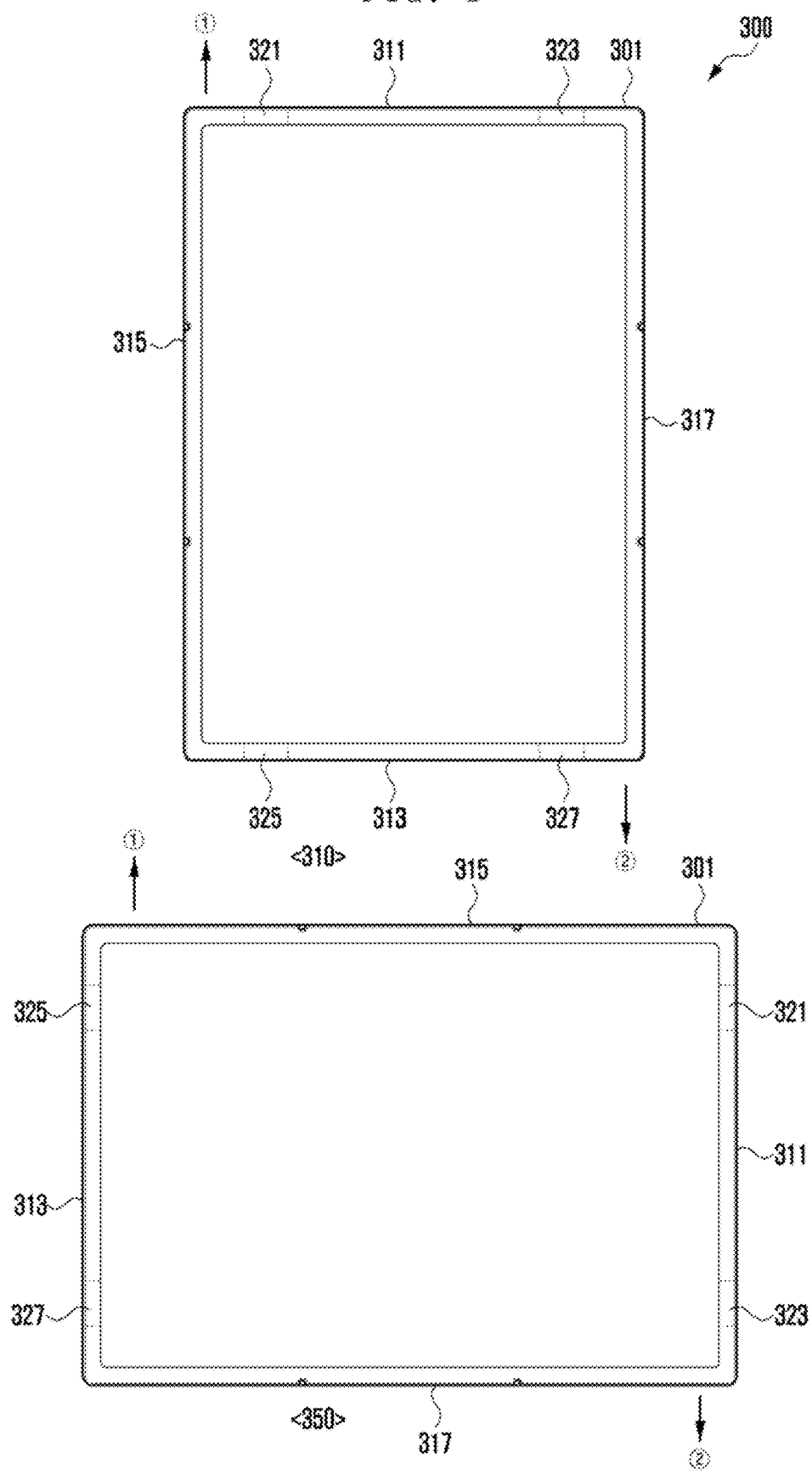
FIG. 3 is a diagram illustrating an electronic device according to an embodiment of the disclosure.

FIG. 3 is a diagram 300 illustrating an electronic device 301 according to an embodiment of the disclosure.

Referring to FIG. 3, reference number <310> indicates that orientation information of an electronic device 301 (e.g., the electronic device 101 of FIG. 1) is a portrait mode, and reference number <350> indicates that orientation information of the electronic device 301 is a landscape mode.

In various embodiments, the electronic device 301 may identify orientation information thereof through a sensor (e.g., the sensor module 176 of FIG. 1). Orientation information of the electronic device 301 may include a portrait mode (e.g., a state of reference number <310>) and a landscape mode (e.g., a state of reference number <350>).

For example, a state in which orientation information of the electronic device 301 indicates a portrait mode may include a state in which, as illustrated in reference number <310>, a first side surface 311 of the electronic device 301 is disposed to face in a first direction (e.g., ① direction) and in which a second side surface 313 of the electronic device 301 is disposed to face in a second direction (e.g., ② direction) opposite to the first direction (e.g., ① direction).

For another example, a state in which orientation information of the electronic device 301 indicates a landscape mode includes a state in which, as illustrated in reference number <350>, a third side surface 315 longer than the first side surface 311 of the electronic device 301 is disposed to face in the first direction (e.g., ① direction) and in which a fourth side surface 317 longer than the second side surface 313 of the electronic device 301 is disposed to face in the second direction (e.g., direction ②) opposite to the first direction (e.g., ① direction).

In various embodiments, the electronic device 301 may include a plurality of audio output devices. For example, the plurality of audio output devices includes a first audio output device 321, a second audio output device 323, a third audio output device 325, and a fourth audio output device 327. For example, the first audio output device 321 is disposed in a first area of the first side surface 311 of the electronic device 301. The second audio output device 323 may be disposed in a second area of the first side surface 311 of the electronic device 301. The third audio output device 325 may be disposed in the first area of the second side surface 313 of the electronic device 301. The fourth audio output device 327 may be disposed in the second area of the second side surface 313 of the electronic device 301.

In various embodiments, a plurality of audio output devices 321, 323, 325, and 327 may be disposed at positions corresponding to each other. For example, the first audio output device 321 is disposed in the first area of the first side surface 311 of the electronic device 301, and the third audio output device 325 may be disposed in the first area of the second side surface 313 of the electronic device 301 corresponding to this position. The second audio output device 323 may be disposed in the second area of the first side surface 311 of the electronic device 301, and the fourth audio output device 327 may be disposed in the second area of the second side surface 313 of the electronic device 301 corresponding to this position.

Referring to FIG. 3 according to various embodiments, it has been described that the electronic device 301 includes four audio output devices 321, 323, 325, and 327, but the disclosure is not limited thereto. For example, the electronic device 301 includes audio output devices more than four audio output devices. A position in which four audio output devices are disposed in the electronic device 301 is not limited to the embodiment of FIG. 3.

In various embodiments, a position in which the plurality of audio output devices are disposed when orientation information of the electronic device 301 is a portrait mode (e.g., reference number <310>) and the electronic device 301 is viewed from the front and a position in which the plurality of audio output devices are disposed when orientation information of the electronic device 301 is a landscape mode (e.g., reference number <350>) and the electronic device 301 is viewed from the front may be different.

For example, as illustrated in reference number <310>, when orientation information of the electronic device 301 is a portrait mode and the electronic device 301 is viewed from the front, the first audio output device 321 is disposed at the top left side of the electronic device 301, the second audio output device 323 is disposed at the top right side of the electronic device 301, the third audio output device 325 is disposed at the bottom left side of the electronic device 301, and the fourth audio output device 327 is disposed at the bottom right side of the electronic device 301.

For another example, as illustrated in reference number <350>, when orientation information of the electronic device 301 is a landscape mode and the electronic device 301 is viewed from the front, the first audio output device 321 is disposed at the top right side of the electronic device 301, the second audio output device 323 is disposed at the bottom right side of the electronic device 301, the third audio output device 325 is disposed at the top left side of the electronic device 301, and the fourth audio output device 327 is disposed at the bottom left side of the electronic device 301.

In various embodiments, the electronic device 301 may transmit channel information of audio data to be finally output from each audio output device 321, 323, 325, or 327 according to orientation information thereof to each audio output device 321, 323, 325, or 327. For example, audio data may include multi-channel audio data. When multi-channel audio data is assumed to 2-channel audio data, in order to output audio data of a first channel (e.g., left channel (L channel)) or a second channel (e.g., right channel (R channel)), the electronic device 301 transmits channel information including first channel information or second channel information of audio data to each audio output device 321, 323, 325, or 327.

In relation to an embodiment that transmits channel information of audio data to be finally output from each audio output device 321, 323, 325, or 327 according to the aforementioned orientation information of the electronic device 301 according to various embodiments to each audio output device 321, 323, 325, or 327, various embodiments will be described in FIGS. 5A, 5B, 6, and 7 to be described later.

Figure 4:
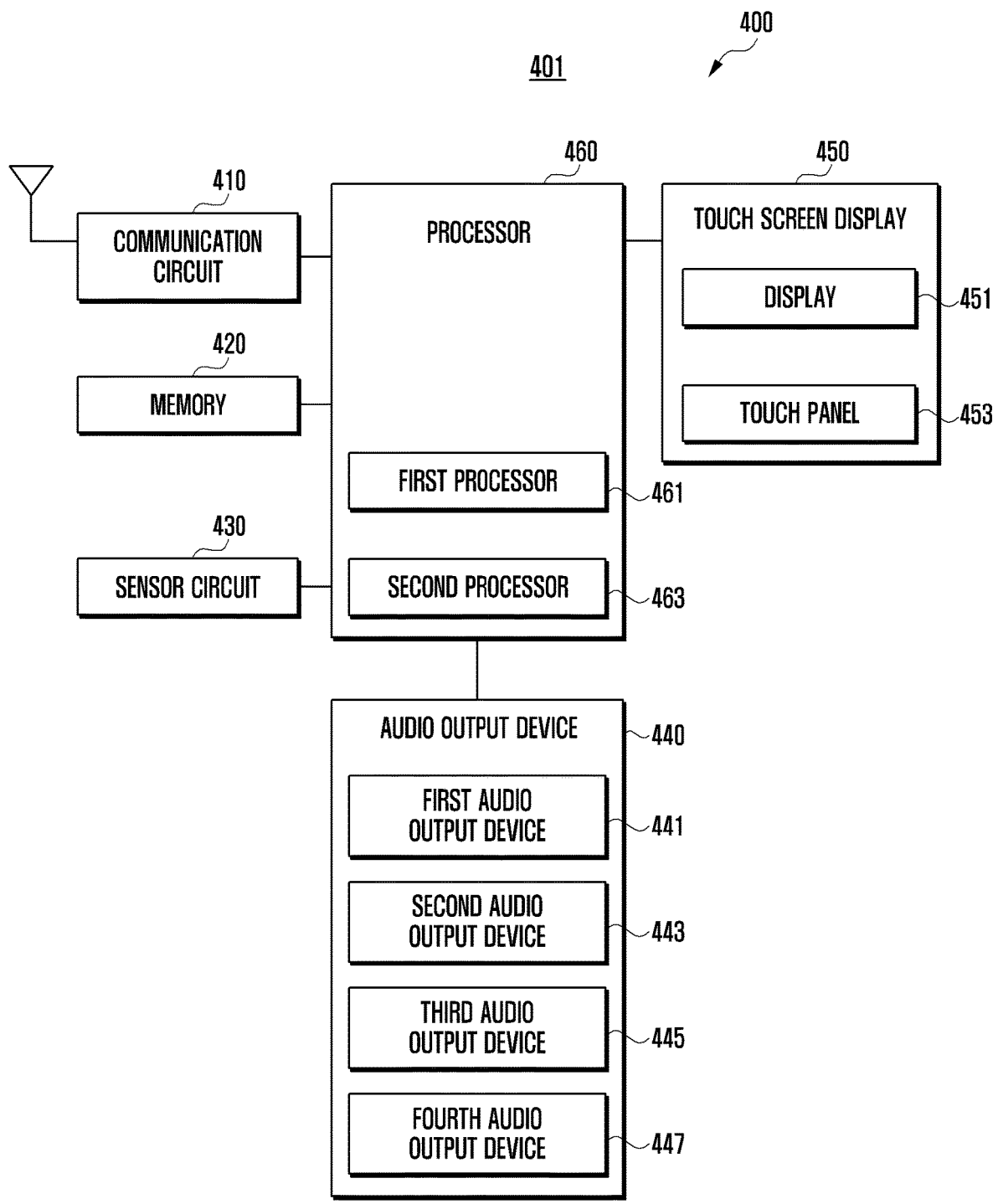
FIG. 4 is a block diagram illustrating an electronic device according to an embodiment of the disclosure.

FIG. 4 is a block diagram illustrating an electronic device 401 according to an embodiment of the disclosure.

Referring to FIG. 4, in a block diagram 400, the electronic device 401 (e.g., the electronic device 301 of FIG. 3) may include a communication circuit 410 (e.g., the communication module 190 of FIG. 1), a memory 420 (e.g., the memory 130 of FIG. 1), a sensor circuit 430 (e.g., the sensor module 176 of FIG. 1), an audio output device 440 (e.g., the sound output module 155 of FIG. 1), a touch screen display 450 (e.g., the display module 160 of FIG. 1), and/or a processor 460 (e.g., the processor 120 of FIG. 1).

According to various embodiments of the disclosure, the communication circuit 410 (e.g., the communication module 190 of FIG. 1) may establish a communication channel with an external electronic device (e.g., the electronic devices 102 and 104 and the server 108 of FIG. 1) and support to transmit and receive various data to and from an external electronic device.

According to various embodiments of the disclosure, the memory 420 (e.g., the memory 130 of FIG. 1) may store channel information of audio data to be finally output from each audio output device 441, 443, 445, or 447 (e.g., each audio output device 321, 323, 325, or 327 of FIG. 3) according to orientation information of the electronic device 401. In the case that the electronic device 401 is a foldable electronic device, the memory 420 may store channel information of audio data to be finally output from each audio output device 441, 443, 445, or 447 according to orientation information and/or a folding state of the electronic device 401 (e.g., the foldable electronic device).

In an embodiment, the memory 420 may store instructions that enables to perform an operation of controlling each audio output device 441, 443, 445, or 447 so that each audio output device 441, 443, 445, or 447 selects a channel to be finally output and outputs audio data of the selected channel based on channel information of audio data transmitted to each audio output device 441, 443, 445, or 447 and based on orientation information and/or a folding state of the electronic device 401.

According to various embodiments of the disclosure, the sensor circuit 430 (e.g., the sensor module 176 of FIG. 1) may include an acceleration sensor, a geomagnetic field sensor, and/or a gyro sensor. The sensor circuit 430 may identify (or detect or determine) a direction in which a first side surface (e.g., the first side surface 311 of FIG. 3) of the electronic device 401 faces. The sensor circuit 430 may acquire movement information (e.g., a movement direction of the electronic device 401 and an inclination of the electronic device 401) of the electronic device 401, and identify (or detect, determine) a direction in which the first side surface 311 of the electronic device 401 faces based on the movement information.

According to various embodiments, the sensor circuit 430 may include at least one of a proximity sensor, an infrared (IR) sensor, a hall sensor, a motion sensor, an angle sensor, or an illuminance sensor. The sensor circuit 430 may identify a folding state (e.g., a flat state, a folding state, and/or a flat state at a predetermined angle) based on a distance (or angle) between a first housing structure and a second housing structure of the electronic device 401.

According to various embodiments of the disclosure, the audio output device 440 (e.g., the sound output module 155 of FIG. 1) may include a plurality of audio output devices, for example, a first audio output device 441 (e.g., the audio output module 321 of FIG. 3), a second audio output device 443 (e.g., the second audio output device 323 of FIG. 3), a third audio output device 445 (e.g., the third audio output device 325 of FIG. 3), and a fourth audio output device 447 (e.g., the fourth audio output device 327 of FIG. 3).

In another embodiment, each audio output device 441, 443, 445, or 447 may select a channel to be finally output based on channel information of audio data and output audio data of the selected channel under the control of the processor 460.

According to various embodiments of the disclosure, the touch screen display 450 (e.g., the display module 160 of FIG. 1) may be formed in an integral form including a display 451 and a touch panel 453.

In another embodiment, the touch screen display 450 may display an image under the control of the processor 460, and be implemented into any one of a liquid crystal display (LCD), a light-emitting diode (LED) display, an organic light emitting diode (OLED) display, a micro electro mechanical systems (MEMS) display, an electronic paper display, or a flexible display. However, the disclosure is not limited thereto.

In an embodiment, the touch screen display 450 may display a user interface that enables a user to control a function related to audio reproduction under the control of the processor 460.

According to various embodiments of the disclosure, the processor 460 (e.g., the processor 120 of FIG. 1) may include, for example, a micro controller unit (MCU), and drive an operating system (OS) or an embedded software program to control a plurality of hardware components connected to the processor 460. The processor 460 may control, for example, a plurality of hardware components according to instructions (e.g., the program 140 of FIG. 1) stored in the memory 420.

In another embodiment, the processor 460 may include a first processor 461 and a second processor 463.

In various embodiments, the first processor 461 may control overall operation of the electronic device 401 and signal flow between internal components of the electronic device 401 and perform data processing.

In various embodiments, the second processor 463 may control the audio output device 440, for example, a first audio output device 441, a second audio output device 443, a third audio output device 445, and a fourth audio output device 447. The second processor 463 may be one processor for controlling the audio output device 440 or may be included in each of a plurality of audio output devices (e.g., the first audio output device 441, the second audio output device 443, the third audio output device 445, and the fourth audio output device 447).

In another embodiment, the first processor 461 may detect an output of audio data. The audio data may include multi-channel audio data, and include, for example, audio data of a first channel (e.g., L channel) and audio data of a second channel (e.g., R channel). The first processor 461 may transfer audio data of a first channel (e.g., L channel) and audio data of a second channel (e.g., R channel) to the second processor 463.

In another embodiment, the first processor 461 may identify orientation information of the electronic device 401. Orientation information of the electronic device 401 may include a portrait mode and a landscape mode. For example, the first processor 461 detects a direction in which a first side surface (e.g., the first side surface 311 of FIG. 3) of the electronic device 401 faces through the sensor circuit 430 and identify orientation information of the electronic device 401 based on the direction. The first processor 461 may identify channel information of audio data to be finally output from each audio output device according to a position in which each of the plurality of audio output devices is disposed in the electronic device 401 based on orientation information of the electronic device 401. The first processor 461 may transfer channel information of audio data to be finally output by the plurality of audio output devices 441, 443, 445, and 447 to the second processor 463.

In another embodiment, the second processor 463 may control the plurality of audio output devices 441, 443, 445, and 447 so that each audio output device outputs audio data of a corresponding channel based on the channel information received from the first processor 461. For example, the second processor 463 controls the plurality of audio output devices 441, 443, 445, and 447 to output audio data of the first channel (e.g., L channel) or audio data of the second channel (e.g., R channel) based on channel information of audio data received from the first processor 461.

In another embodiment, in the case that the first processor 461 identifies that orientation information of the electronic device 401 is changed (e.g., switched), the first processor 461 may transmit changed channel information of audio data to be finally output from each audio output device to the second processor 463 according to the changed orientation information of the electronic device 401. For example, the change of orientation information of the electronic device 401 includes a change from a portrait mode to a landscape mode or a change from a landscape mode to a portrait mode. When the electronic device 401 is viewed from the front based on switching of orientation information of the electronic device 401 from a portrait mode (or landscape mode) to a landscape mode (or portrait mode), position information in which the plurality of audio output devices 441, 443, 445, and 447 are disposed may also be changed, and accordingly, channel information of audio data to be finally output may also be changed.

In another embodiment, the second processor 463 may control the plurality of audio output devices 441, 443, 445, and 447 so that each audio output device 441, 443, 445, or 447 outputs audio data of a corresponding channel based on the channel information received from the first processor 461.

In various embodiments, in the case that the electronic device 401 is composed of a foldable electronic device, the first processor 461 may further identify the folding state of the electronic device 401 as well as orientation information of the electronic device 401. The folding state of the electronic device 401 may include a flat state and a closing state. For example, the electronic device 401 identifies channel information of audio data to be output from each audio output device according to position information in which each of a plurality of audio output devices is disposed based on orientation information and/or a folding state thereof. The first processor 461 may transfer channel information of audio data to be output by the plurality of audio output devices 441, 443, 445, and 447 to the second processor 463 based on orientation information and/or a folding state of the electronic device 401. The second processor 463 may control the plurality of audio output devices 441, 443, 445, and 447 so that each audio output device 441, 443, 445, or 447 outputs audio data of a corresponding channel based on channel information received from the first processor 461.

The electronic device 401 according to various embodiments may include a plurality of audio output devices (e.g., the first audio output device 441, the second audio output device 443, the third audio output device 445, and the fourth audio output device 447), and a processor 460 operatively connected to the plurality of audio output devices (e.g., the first audio output device 441, the second audio output device 443, the third audio output device 445, and the fourth audio output device 447), and the processor 460 may be configured to identify orientation information of the electronic device 401 based on detecting an output of audio data, to transmit channel information of audio data to be output by each of the plurality of audio output devices to each audio output device based on orientation information of the electronic device 401, and to control the plurality of audio output devices so that each audio output device selects a channel and outputs audio data of the selected channel based on the channel information.

The processor 460 according to various embodiments may be configured to generate the audio data into multi-channel audio data, and to transfer the generated multi-channel audio data to the plurality of audio output devices (e.g., the first audio output device 441, the second audio output device 443, the third audio output device 445, and the fourth audio output device 447), and the multi-channel audio data may include audio data of the first channel and audio data of the second channel.

The processor 460 according to various embodiments may be configured to control at least some audio output devices to output audio data of the first channel among the multi-channel audio data through the at least some audio output devices among the plurality of audio output devices (e.g., the first audio output device 441, the second audio output device 443, the third audio output device 445, and the fourth audio output device 447) based on channel information of the audio data, and to control at least some other audio output devices to output audio data of the second channel among the multi-channel audio data through the at least some other audio output devices among the plurality of audio output devices (e.g., the first audio output device 441, the second audio output device 443, the third audio output device 445, and the fourth audio output device 447).

The processor 460 according to various embodiments may be configured to transmit changed channel information of audio data to be output by each audio output device according to the changed orientation information to each audio output device based on detecting a change in orientation information of the electronic device 401, and to control the plurality of audio output devices (e.g., the first audio output device 441, the second audio output device 443, the third audio output device 445, and the fourth audio output device 447) so that each audio output device selects a channel and outputs audio data of the selected channel based on the changed channel information.

The processor 460 according to various embodiments may be configured to control at least some audio output devices to output audio data of the second channel among the received multi-channel audio data through the at least some audio output devices among the plurality of audio output devices (e.g., the first audio output device 441, the second audio output device 443, the third audio output device 445, and the fourth audio output device 447) based on the changed channel information of the audio data, and to control at least some other audio output devices to output audio data of the first channel among the multi-channel audio data through the at least some other audio output devices among the plurality of audio output devices (e.g., the first audio output device 441, the second audio output device 443, the third audio output device 445, and the fourth audio output device 447).

The electronic device 401 according to various embodiments may include a foldable electronic device.

The electronic device 401 according to various embodiments is a foldable electronic device, and the processor 460 may be configured to identify the folding state of the electronic device 401 based on detecting an output of the audio data.

The processor 460 according to various embodiments may be configured to transmit second channel information of audio data to be output by each of the plurality of audio output devices (e.g., the first audio output device 441, the second audio output device 443, the third audio output device 445, and the fourth audio output device 447) to the each audio output device based on orientation information and/or the folding state of the electronic device 401; and to control the plurality of audio output devices (e.g., the first audio output device 441, the second audio output device 443, the third audio output device 445, and the fourth audio output device 447) so that the each audio output device selects a channel and outputs audio data of the selected channel based on the second channel information.

The processor 460 according to various embodiments may include a first processor 461 and a second processor 463, and the first processor 461 may transmit channel information of audio data to be output by each of the plurality of audio output devices (e.g., the first audio output device 441, the second audio output device 443, the third audio output device 445, and the fourth audio output device 447) to the second processor 463 based on orientation information of the electronic device 401, and the second processor 463 may be configured to control the plurality of audio output devices (e.g., the first audio output device 441, the second audio output device 443, the third audio output device 445, and the fourth audio output device 447) to output audio data of a channel configured in each audio output device based on the channel information.

The second processor 463 according to various embodiments may be configured to be included in each of the plurality of audio output devices (e.g., the first audio output device 441, the second audio output device 443, and the third audio output device 445, and the fourth audio output device 447).

In various embodiments, the orientation information of the electronic device 401 may include a portrait mode and a landscape mode, and the folding state of the electronic device 401 may include a flat state and a folding state of the electronic device 401.

FIG. 5A is a diagram illustrating a hierarchy structure of an electronic device according to an embodiment of the disclosure.

Referring to FIG. 5A, in a diagram 500, the electronic device (e.g., the electronic device 401 of FIG. 4) may include software and hardware.

In an embodiment, software (e.g., the program 140 of FIG. 1) may be loaded from a non-volatile memory (e.g., the non-volatile memory 134 of FIG. 1) to a volatile memory (e.g., the volatile memory 132 of FIG. 1) to be executed by the processor (e.g., the processor 460 of FIG. 4). The software may include an application layer 510, a platform layer 520, a kernel layer 530, and/or an audio layer 540.

In an embodiment, the hardware may include an input/output device 550. For example, the input/output device 550 may include an audio output device 551 (e.g., the first audio output device 441, the second audio output device 443, the third audio output device 445, and the fourth audio output device 447 of FIG. 4).

In another embodiment, the application layer 510, the platform layer 520, the kernel layer 530, and the audio layer 540 may be execute in the first processor (e.g., the first processor 461 of FIG. 4). The input/output device 550 may be controlled by the second processor (e.g., the second processor 463 of FIG. 4).

In various embodiments, the application layer 510 may include a media application 511 (e.g., the media player 273 of FIG. 2).

In various embodiments, the media application 511 may include an application for controlling a function related to audio playback (e.g., a function of enabling audio playback, a function of disabling audio playback, a function of adjusting the volume during audio playback, an audio equalizer function, or a function of controlling audio playback). The media application 511 may provide a user interface that enables a user to control a function related to audio playback. When a user input is received in the user interface, the media application 511 may transmit configuration information corresponding to the received user input to an audio framework 523 of the platform layer 520.

In various embodiments, the media application 511 may output multi-channel audio data. For example, multi-channel audio data includes various types of multi-channel audio data used for providing stereoscopic sound such as 2-channel (or stereo), 2.1-channel, 5.1-channel, and 7.1-channel audio. The media application 511 may process output audio data to generate multi-channel audio data. For example, when multi-channel audio data is assumed to two-channel audio data, the media application 511 may generate audio data of a first channel (e.g., L channel) and audio data of a second channel (e.g., R channel).

In various embodiments, the media application 511 may transfer the generated audio data of the first channel (e.g., L channel) and audio data 563 of the second channel (e.g., R channel) to a stream module 541 of the audio layer 540 through the platform layer 520 and the kernel layer 530.

In various embodiments, the platform layer 520 may include a multimedia framework 521 (e.g., the multimedia manager 205 of FIG. 2), an audio framework 523 (e.g., the multimedia manager 205 of FIG. 2), and/or an audio hardware abstraction layer (HAL) 525 (e.g., the multimedia manager 205 of FIG. 2). The audio HAL 525 may include a control module 527.

In various embodiments, the control module 527 of the audio HAL 525 may transfer control data 565 for controlling the plurality of audio output devices 441, 443, 445, and 447, for example, channel information of audio data to be output by the plurality of audio output devices 441, 443, 445, and 447 to the input/output device 550. For example, channel information of audio data to be finally output from each audio output device 441, 443, 445, or 447 according to the orientation information of the electronic device 401 may be stored in the memory (e.g., the memory 420 of FIG. 4). The control module 527 may transfer channel information of audio data to be output by each audio output device 441, 443, 445, or 447 according to the orientation information of the electronic device 401 stored in the memory 420 to the input/output device 550.

In various embodiments, the multimedia framework 521 may provide an application programming interface (API) related to playback of audio to be reproduced by the media application 511. The multimedia framework 521 may convert audio data to be reproduced into a format (e.g., pulse code modulation (PCM) data format) that may be provided to the audio layer 540 with a method of decoding.

In various embodiments, the multimedia framework 521 may transmit information on audio data (e.g., sampling rate of audio data, number of channels, and/or bit-width of audio data) to the audio framework 523.

In various embodiments, the audio framework 523 may provide functions that may be supported by a component (e.g., the audio output device 440 of FIG. 4) of the electronic device 401 capable of performing an audio output by the media application 511.

In various embodiments, the audio framework 523 may receive audio data transmitted by the multimedia framework 521 and convert the received audio data into an audio stream. The audio stream may refer to audio data classified in various ways. For example, the audio stream may refer to audio data classified according to the size of a buffer required to process the same. The buffer may include a buffer implemented on the stream module 541. For example, the audio stream includes an audio stream including audio provided by the media application 511 requiring a buffer having a relatively large size, and an audio stream including audio (e.g., notification sounds, ring-tone sounds) provided by a notification application or a phone application requiring a buffer having a relatively small size. The audio streams may be classified according to output channels or output devices.

In various embodiments, the audio HAL 525 may manage an abstraction layer between hardware (e.g., the input/output device 550) and the media application 511, the multimedia framework 521, or the audio framework 523. The audio HAL 525 may receive information on the input/output device 550 transmitted by the audio framework 523, generate a control signal for controlling the input/output device 550, and transmit the control signal to an audio driver 533.

In various embodiments, the audio HAL 525 may control the audio driver 533 based on information on the audio stream (e.g., sampling rate of the audio stream, number of channels, and/or size of the audio stream) and information on the input/output device 550.

In various embodiments, the kernel layer 530 may be a layer implemented with entities that control hardware (e.g., the input/output device 550) that outputs audio. The kernel layer 530 may include an audio driver 533 that controls hardware that outputs audio and an advanced Linux sound architecture (ALSA) API & system-on-a-chip core (SOC core) 531 that provides an interface between the audio HAL 525 and the audio driver 533.

In various embodiments, the audio driver 533 may receive a control signal transmitted by the audio HAL 525 and control hardware (e.g., the input/output device 550) that outputs audio based on the control signal.

In various embodiments, the audio layer 540 may process the audio stream generated in the application layer 510 and the platform layer 520 and perform various operations for outputting the audio stream to the input/output device 550. The audio layer 540 may include a stream module 541, a device module 543, and/or a port module 545.

In various embodiments, the stream module 541 may receive an audio stream and a control signal transmitted from the audio HAL 525 of the platform layer 520, and process the audio stream based on the control signal. A stream processing module 542 included in the stream module 541 may receive a control signal requesting audio playback, apply various effects (e.g., sound field effects) to the received audio stream, and transmit the processed audio stream to the device module 543. The stream processing module 542 may process the audio stream for each audio stream unit. The stream processing module 542 may include a buffer in order to process the audio stream.

In various embodiments, the device module 543 may include a device processing module 544 that performs post-processing on the audio stream transmitted from the stream module 541.

In various embodiments, the port module 545 may include an output port module 546 that assigns an audio stream transmitted by the device module 543 to an output port.

In various embodiments, the input/output device 550 may receive channel information (e.g., the control data 565) of audio data to be output by a plurality of audio output devices from the control module 527 of the audio HAL 525.

In various embodiments, the input/output device 550 may receive audio data of a first channel (e.g., L channel) and audio data 563 of a second channel (e.g., R channel) output from the media application 511 through the stream module 541, the device module 543, and the port module 545 of the audio layer 540. The audio data of the first channel (e.g., L channel) and the audio data 563 of the second channel (e.g., R channel) may include original audio data of the first channel and audio data of the second channel that do not undergo separate processing.

In various embodiments, the input/output device 550 may receive control data 565 for controlling the audio output device 551 according to the orientation information of the electronic device 401 from the control module 527 of the audio HAL 525 through the kernel layer 530, for example, channel information of audio data to be output by the plurality of audio output devices 441, 443, 445, and 447.

According to various embodiments, each audio output device 441, 443, 445, or 447 included in the input/output device 550 may output (561) audio data of a first channel (e.g., L channel) or audio data 563 of a second channel (e.g., R channel) based on channel information.

In various embodiments, in the case that the electronic device 401 is composed of a foldable electronic device, the input/output device 550 may receive control data 565 for controlling the plurality of audio output devices 441, 443, 445, and 447 according to the orientation information and/or the folding state of the electronic device 401 from the control module 527 of the audio HAL 525 through the kernel layer 530, for example, channel information of audio data to be output by the plurality of audio output devices 441 and 443, 445, and 447.

Figure 5B:
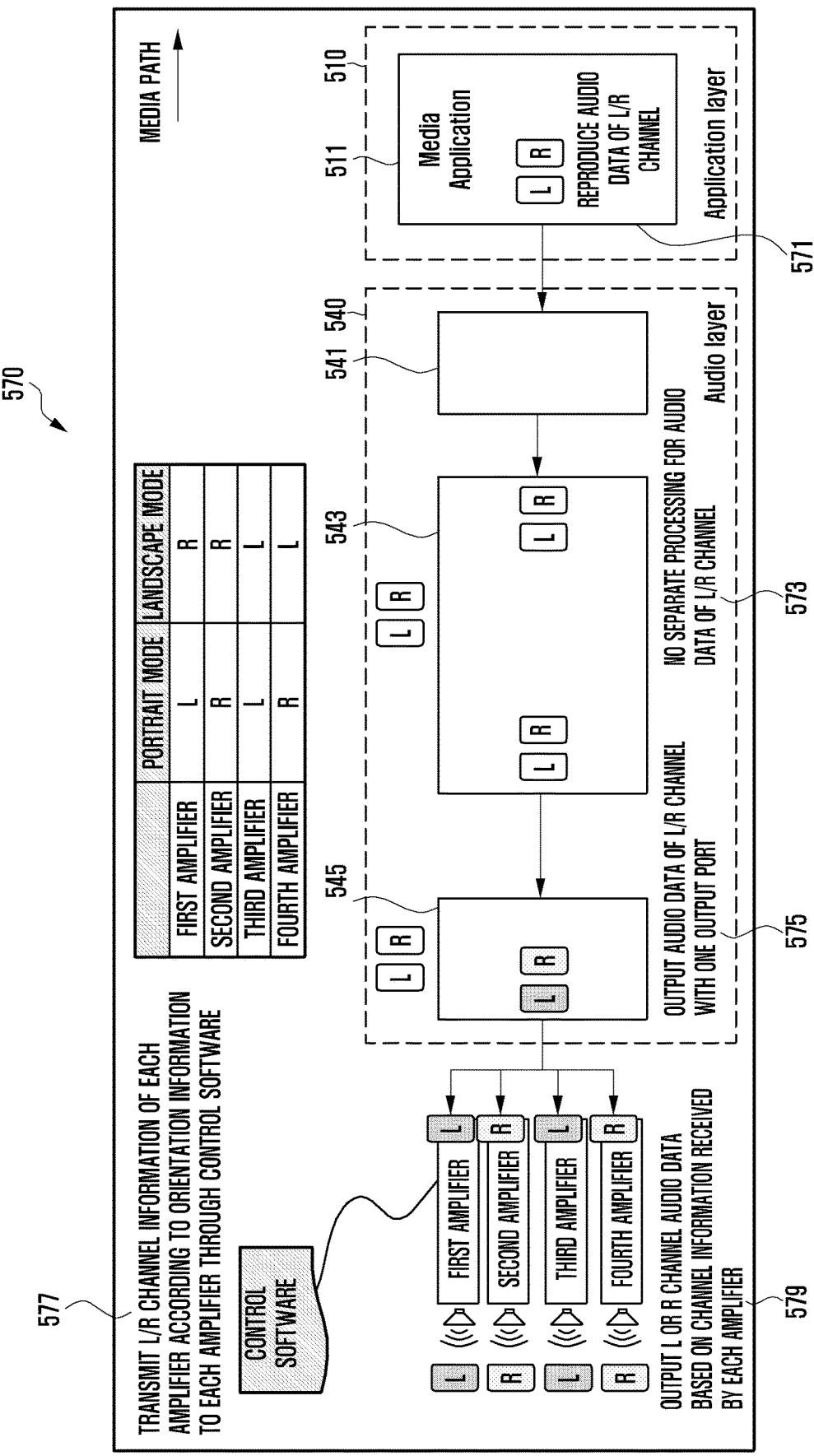
FIG. 5B is a diagram illustrating a method of outputting multi-channel audio data according to orientation information of an electronic device according to an embodiment of the disclosure.

FIG. 5B is a diagram illustrating a method of outputting multi-channel audio data according to orientation information of an electronic device according to an embodiment of the disclosure.

Referring to FIG. 5B, in a diagram 570, the media application 511 of the application layer 510 may reproduce (571) audio data of a left (L) channel (e.g., first channel) and audio data of a right (R) channel (e.g., second channel).

In an embodiment, reproduced audio data of an L channel (e.g., first channel) and audio data 571 of an R channel (e.g., second channel) may be transferred to the port module 545 through the stream module 541 and the device module 543 of the audio layer 540 without separate processing (573). The port module 545 may output (575) audio data of an L channel (e.g., first channel) and audio data 571 of an R channel (e.g., second channel) reproduced through one output port to an audio output device, for example, a first amplifier (e.g., the first audio output device 441 of FIG. 4), a second amplifier (e.g., the second audio output device 443 of FIG. 4), a third amplifier (e.g., the third audio output device 445 of FIG. 4), and a fourth amplifier (e.g., the fourth audio output device 447 of FIG. 4).

In another embodiment, the control module 527 of the audio HAL 525 may transmit (577) channel information (e.g., L channel (e.g., first channel) information and R channel (e.g., second channel) information) of audio data to be output by each amplifier according to orientation information (e.g., portrait mode and landscape mode) of the electronic device 401 to an audio output device, for example, a first amplifier, a second amplifier, a third amplifier, and a fourth amplifier through control software.

In another embodiment, each amplifier (e.g., the first amplifier, the second amplifier, the third amplifier, or the fourth amplifier) may output (579) audio data of an L-channel or audio data of an R-channel based on the received channel information. For example, in the case that orientation information of the electronic device 401 is a portrait mode, the electronic device 401 controls the first amplifier and/or the third amplifier to output L-channel audio data based on the received channel information and control each amplifier so that the second amplifier and/or the fourth amplifier outputs R-channel audio data. For another example, in the case that orientation information of the electronic device 401 is a landscape mode, the electronic device 401 controls the first amplifier and/or the second amplifier to output R-channel audio data and control each amplifier so that the third amplifier and/or the fourth amplifier output(s) L-channel audio data based on the received channel information.

FIG. 6 is a flowchart illustrating a method of outputting multi-channel audio data according to orientation information of the electronic device 401 according to an embodiment of the disclosure.

Referring to FIG. 6, in a method 600, the processor (e.g., the processor 460 of FIG. 4) (e.g., the first processor 461 of FIG. 4) of the electronic device (e.g., the electronic device 401 of FIG. 4) may detect an output of audio data in operation 605.

In an embodiment, the processor 460 (e.g., the first processor 461) may detect an output of audio data through a media application (e.g., the media application 511 of FIG. 5A). The audio data may include multi-channel audio data. The multi-channel audio data may include various types of multi-channel audio data used for providing stereoscopic sound such as 2-channel (or stereo), 2.1-channel, 5.1-channel, and/or 7.1-channel audio.

In another embodiment, the processor 460 (e.g., the first processor 461) may process audio data output through the media application 511 to generate multi-channel audio data.

In the following embodiments, multi-channel audio data is assumed to 2-channel audio data. For example, the processor 460 generates audio data into audio data of a first channel (e.g., L channel) and audio data of a second channel (e.g., R channel).

In another embodiment, the processor 460 (e.g., the first processor 461) may transfer the generated audio data of the first channel (e.g., L channel) and audio data of the second channel (e.g., R channel) to an input/output device (e.g., the input/output device 550 of FIG. 5A) (e.g., the second processor 463 of FIG. 4) through a platform layer (e.g., the platform layer 520 of FIG. 5A), a kernel layer (e.g., the kernel layer 530 of FIG. 5A), and an audio layer (e.g., the audio layer 540 of FIG. 5A).

In another embodiment, the processor 460 (e.g., the first processor 461) may identify orientation information of the electronic device 401 in operation 610. For example, the processor 460 (e.g., the first processor 461) identifies a direction in which the first side surface (e.g., the first side surface 311 of FIG. 3) of the electronic device 401 faces through a sensor circuit (e.g., the sensor circuit 430 of FIG. 4) (e.g., acceleration sensor, geomagnetic sensor, and/or gyro sensor). The processor 460 (e.g., the first processor 461) may acquire movement information (e.g., a movement direction of the electronic device 401 and an inclination of the electronic device 401) of the electronic device 401 through the sensor circuit 430 and determine a direction in which the first side surface 311 of the electronic device 401 faces based on the movement information.

In another embodiment, orientation information of the electronic device 401 may include a portrait mode and a landscape mode.

In another embodiment, the processor 460 (e.g., the first processor 461) may transmit channel information of audio data to be finally output to each audio output device based on the orientation information of the electronic device 401 in operation 615.

In various embodiments, the electronic device 401 may include a plurality of audio output devices. For example, the plurality of audio output devices includes a first audio output device (e.g., the first audio output device 321 of FIG. 3), a second audio output device (e.g., the second audio output device 323 of FIG. 3), a third audio output device (e.g., the third audio output device 325 of FIG. 3), and a fourth audio output device (e.g., the fourth audio output device 327 of FIG. 3).

In various embodiments, a position in which a plurality of audio output devices are disposed when orientation information of the electronic device 401 is a portrait mode (e.g., reference number <310>) and the electronic device 401 is viewed from the front and a position in which the plurality of audio output devices are disposed when orientation information of the electronic device 401 is a landscape mode (e.g., reference number <350>) and the electronic device 401 is viewed from the front may be different.

For example, when the orientation information of the electronic device 401 is a portrait mode and the electronic device 401 is viewed from the front, it is identified that the first audio output device 321 is disposed at the top left side of the electronic device 401, and when the orientation information of the electronic device 401 is a landscape mode and the electronic device 401 is viewed from the front, it is identified that the first audio output device 321 is disposed at the top right side of the electronic device 401.

For another example, when the orientation information of the electronic device 401 is a portrait mode (e.g., reference number <310>) and the electronic device 401 is viewed from the front, it is identified that the second audio output device 323 is disposed at the top right side of the electronic device 401, and when the orientation information of the electronic device 401 is a landscape mode and the electronic device 401 is viewed from the front, it is identified that the second audio output device 323 is disposed at the bottom right side of the electronic device 401.

For another example, when the orientation information of the electronic device 401 is a portrait mode (e.g., reference number <310>) and the electronic device 401 is viewed from the front, it may be identified that the third audio output device 325 is disposed at the bottom left side of the electronic device 401, and when the orientation information of the electronic device 401 is a landscape mode and the electronic device 401 is viewed from the front, it may be identified that the third audio output device 325 is disposed at the top left side of the electronic device 401.

For another example, when the orientation information of the electronic device 401 is a portrait mode (e.g., reference number <310>) and the electronic device 401 is viewed from the front, it is identified that the fourth audio output device 327 is disposed at the bottom right side of the electronic device 401, and when the orientation information of the electronic device 401 is a landscape mode and the electronic device 401 is viewed from the front, it is identified that the fourth audio output device 327 is disposed at the bottom left side of the electronic device 401.

In another embodiment, the processor 460 (e.g., the first processor 461) may transmit channel information of audio data to be finally output to each audio output device (e.g., the second processor 463) so that each of a plurality of audio output devices outputs audio data of a different type (e.g., channel) based on an output (e.g., the type (e.g., channel type) of audio data) of audio data of a channel according to position information of each of the plurality of audio output devices based on orientation information of the electronic device 401. For example, the processor 460 (e.g., the first processor 461), for example, the control module 527 included in the audio HAL 525 of the platform layer 520 transfers control data for controlling the plurality of audio output devices 321, 323, 325, and 327 according to orientation information of the electronic device 401, for example, channel information of audio data to be output by the plurality of audio output devices 321, 323, 325, and 327 to the input/output device 550 (e.g., the second processor 463).

In various embodiments, based on orientation information of the electronic device 401 as illustrated in Tables 1 and 2, channel information of audio data to be finally output from each audio output device 321, 323, 325, or 327 according to a position in which each audio output device 321, 323, 325, or 327 is disposed may be stored in the memory (e.g., the memory 420 of FIG. 4).

TABLE 1

| Audio output device | When orientation information of the electronic device is a portrait mode, a position in which the audio output device is disposed | Channel information of audio data to be finally output |
|---|---|---|
| First audio output device 321 | Top left side | First channel (e.g., L channel) |
| Second audio output device 323 | Top right side | Second channel (e.g., R channel) |
| Third audio output device 325 | Bottom left side | First channel (e.g., L channel) |
| Fourth audio output device 327 | Bottom right side | Second channel (e.g., R channel) |

TABLE 2

| Audio output device | When orientation information of the electronic device is a landscape mode, a position in which the audio output device is disposed | Channel information of audio data to be finally output |
|---|---|---|
| First audio output device 321 | Top right side | Second channel (e.g., R channel) |
| Second audio output device 323 | Bottom right side | Second channel (e.g., R channel) |
| Third audio output device 325 | Top left side | First channel (e.g., L channel) |
| Fourth audio output device 327 | Bottom left side | First channel (e.g., L channel) |

In another embodiment, the processor 460 (e.g., the second processor 463) may transmit all audio data to each audio output device and control a plurality of audio output devices so that each audio output device selects a channel to be finally output and outputs audio data based on the channel information in operation 620. For example, the processor 460 (e.g., the second processor 463) controls each audio output device 321, 323, 325, or 327 to output audio data of a corresponding channel based on channel information (e.g., Table 1 or 2) of audio data to be output by the plurality of audio output devices 321, 323, 325, and 327 received from the control module 527 included in the audio HAL 525.

For example, the processor 460 (e.g., the second processor 463) controls the first audio output device 321 and the third audio output device 325 to output audio data of a first channel received from the media application 511 and control the second audio output device 323 and the fourth audio output device 327 to output audio data of the second channel received from the media application 511.

For another example, the processor 460 (e.g., the second processor 463) controls the third audio output device 325 and the fourth audio output device 327 to output audio data of a first channel and control the first audio output device 321 and the second audio output device 323 to output audio data of the second channel.

Channel information of audio data to be output by each audio output device according to Table 1 and Table 2 according to various embodiments is another embodiment, but the disclosure is not limited thereto.

Referring to FIG. 6 according to various embodiments, the electronic device 401 may control a plurality of audio output devices to output audio data of a first channel (e.g., L channel) and audio data (e.g., original first and second audio data not subjected to separate processing) of a second channel (e.g., R channel) generated through the media application 511 based on channel information of audio data to be output by a plurality of audio output devices received through the control module 527, thereby minimizing a time delay according to processing of audio data. Accordingly, in the case that contents such as a game and/or live streaming requiring real-time performance are reproduced, a sense of difference between audio data and video data may be resolved, thereby increasing usability of the electronic device 401.

FIG. 7 is a flowchart illustrating a method of outputting multi-channel audio data based on a change of orientation information of an electronic device according to an embodiment of the disclosure.

Operations of FIG. 7 according to various embodiments may be additional operations of operation 620 of FIG. 6 described above.

Referring to FIG. 7, in a method 700, the processor (e.g., the processor 460 of FIG. 4) (e.g., the first processor 461 of FIG. 4) of the electronic device (e.g., the electronic device 401 of FIG. 4) may identify (or determine) whether orientation information of the electronic device 401 has been changed (e.g., switched) in operation 705. For example, a change in orientation information of the electronic device 401 includes a change from a portrait mode (e.g., reference number <310> of FIG. 3) to a landscape mode (e.g., reference number <350> of FIG. 3) or a change from a landscape mode (e.g., reference number <350> of FIG. 3) to a portrait mode (e.g., reference number <310> of FIG. 3). The processor 460 (e.g., the first processor 461) may acquire movement information of the electronic device 401 through the sensor circuit (e.g., the sensor circuit 430 of FIG. 4), and identify (or determine) whether the orientation information of the electronic device 401 has been changed (e.g., switched) based on the movement information.

In an embodiment, when it is identified that the orientation information of the electronic device 401 has been changed (e.g., YES in operation 705), the processor 460 (e.g., the first processor 461) may transmit the changed channel information of audio data to be finally output to each audio output device based on the changed channel information of the electronic device 401 in operation 710. For example, as the orientation information of the electronic device 401 is switched from a portrait mode (or landscape mode) to a landscape mode (or portrait mode), when the electronic device 401 is viewed from the front, position information in which a plurality of audio output devices 321, 323, 325, and 327 are disposed is also be changed, and accordingly, channel information of audio data to be finally output may also be changed.

In another embodiment, the processor 460 (e.g., the first processor 461), for example, the control module 527 included in the audio HAL 525 of the platform layer 520 may transfer changed control data (e.g., changed channel information of audio data to be output by the plurality of audio output devices 321, 323, 325, and 327) to the input/output device 550 (e.g., the second processor 463) in order to control the plurality of audio output devices 321, 323, 325, and 327 according to the changed orientation information of the electronic device 401.

In another embodiment, the processor 460 (e.g., the second processor 463 of FIG. 4) may transmit all audio data to each audio output device and control the plurality of audio output devices 321, 323, 325, and 327 so that each audio output device selects a channel to be finally output and outputs audio data based on the changed channel information in operation 715.

For example, the processor 460 (e.g., the second processor 463) enables each audio output device 321, 323, 325, or 327 to output audio data of a corresponding channel based on the changed channel information (e.g., Table 1 or 2) of audio data to be output by the plurality of audio output devices 321, 323, 325, and 327 according to the changed orientation information of the electronic device 401 received from the control module 527 included in the audio HAL 525.

For example, in the case that the orientation information of the electronic device 401 is changed from a portrait mode to a landscape mode, the processor 460 (e.g., the second processor 463) enables each audio output device 321, 323, 325, or 327 to output audio data of a corresponding channel based on Table 2 described above. In this case, the processor 460 (e.g., the second processor 463) may control the third audio output device 325 and the fourth audio output device 327 to output audio data of the first channel, and control the first audio output device 321 and the second audio output device 323 to output audio data of the second channel.

For another example, in the case that the orientation information of the electronic device 401 is changed from a landscape mode to a portrait mode, the processor 460 (e.g., the second processor 463) enables each audio output device 321, 323, 325, or 327 to output audio data of a corresponding channel based on Table 1 described above. In this case, the processor 460 (e.g., the second processor 463) may control the first audio output device 321 and the third audio output device 325 to output audio data of the first channel and control the second audio output device 323 and the fourth audio output device 327 to output audio data of the second channel.

In another embodiment, when it is identified that the orientation information of the electronic device 401 has not been changed (e.g., NO in operation 705), the processor 460 (e.g., the second processor 463) may continue to perform operation 620 of FIG. 6 described above.

Referring to FIG. 7 according to various embodiments, in the case that the orientation information of the electronic device 401 is changed while audio data is being output, the processor 460 (e.g., the first processor 461) may dynamically identify orientation information of the electronic device 401 to transfer the changed channel information of audio data to each audio output device 321, 323, 325, or 327. Each audio output device (e.g., the second processor 463) may output audio data of a corresponding channel based on the changed channel information. Accordingly, in the case of detecting a change in the orientation information of the electronic device 401, the plurality of audio output devices may output audio data based on the changed channel information of the audio data without separate processing of the audio data, thereby preventing deterioration in usability of the electronic device 401 due to delay in processing of the audio data.

Figure 8A:
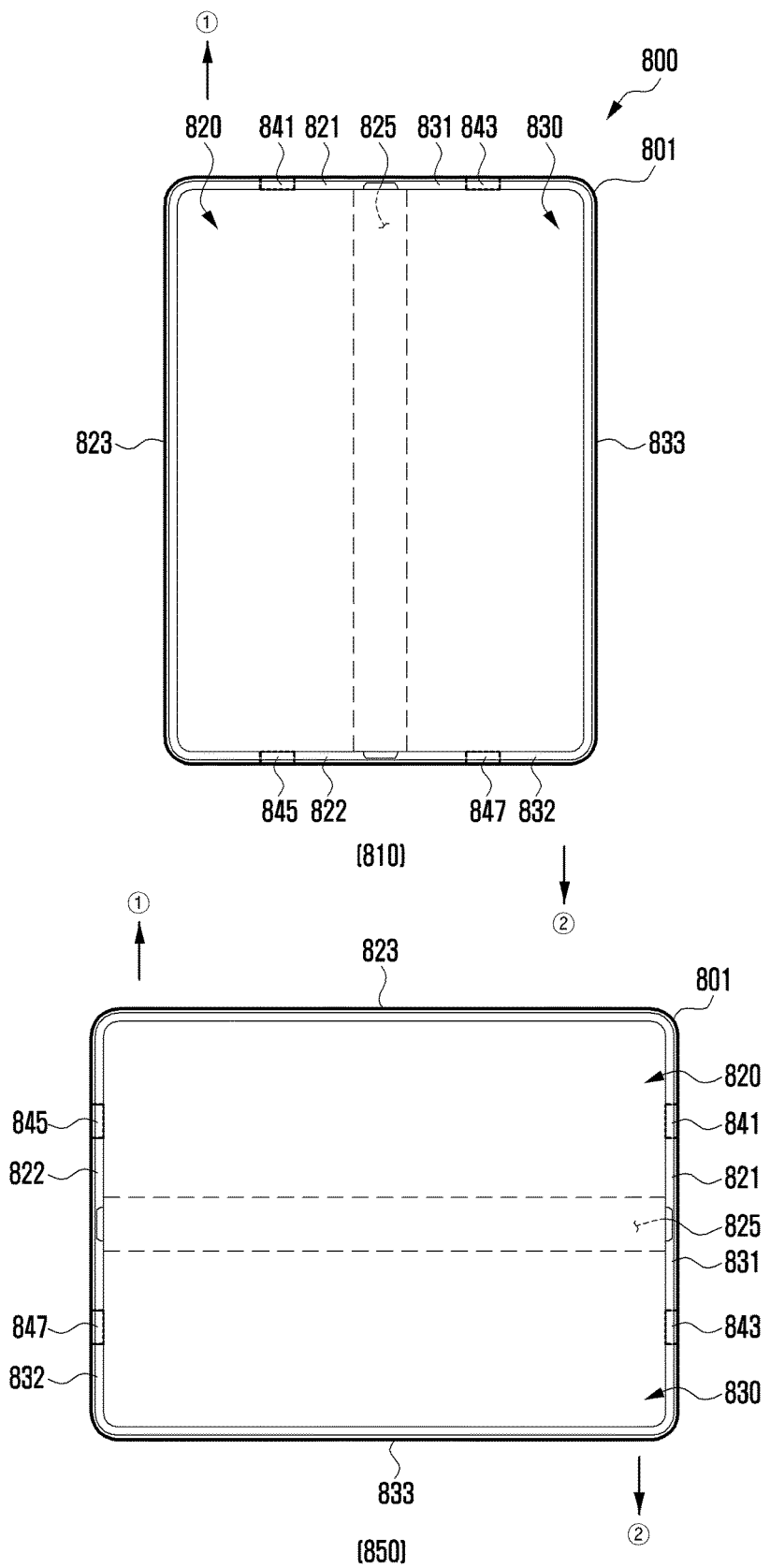
FIG. 8A is a diagram illustrating a flat state or an opening state of an electronic device according to an embodiment of the disclosure.

FIG. 8A is a diagram illustrating a flat state or an opening state of an electronic device according to an embodiment of the disclosure.

Figure 8B:
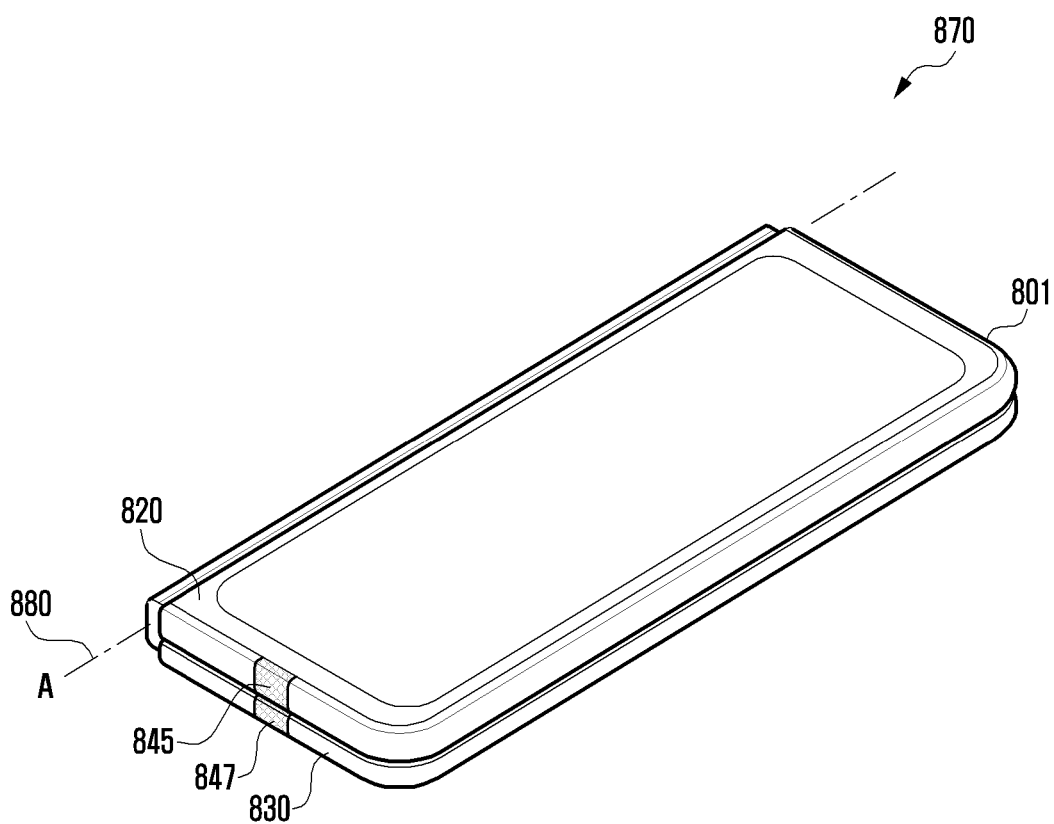
FIG. 8B is a diagram illustrating a folding state or a closing state of an electronic device according to an embodiment of the disclosure.

FIG. 8B is a diagram illustrating a folding state or a closing state of the electronic device according to an embodiment of the disclosure.

In FIG. 3 according to various embodiments, it has been described that an electronic device (e.g., the electronic device 301 of FIG. 3) has a plate type form factor, but the disclosure is not limited thereto. For example, an electronic device 801 has a foldable type (e.g., in-folding type or out-folding type) form factor, as illustrated in FIGS. 8A and 8B.

Referring to FIGS. 8A and 8B, in diagrams 800 and 870, the electronic device 801 (e.g., the electronic device 401 of FIG. 4) may include a pair of housing structures (e.g., a first housing structure 820 and a second housing structure 830) (e.g., foldable housing structure) rotatably coupled through a hinge structure 825 to be folded with respect to each other.

In an embodiment, the first housing structure 820 and the second housing structure 830 may be disposed at both sides of a folding axis 880 around the folding axis 880 and have a generally symmetrical shape with respect to the folding axis 880.

In another embodiment, as illustrated in FIG. 8A, in the case that the electronic device 801 is in a flat state or an opening state, the first housing structure 820 and the second housing structure 830 may form an angle of 180 degrees.

In various embodiments, reference numeral <810> in FIG. 8A indicates that the orientation information of the electronic device 801 is a flat state in a portrait mode, and reference numeral <850> in FIG. 8A indicates that the orientation information of the electronic device 801 is a flat state in a landscape mode.

In various embodiments, the electronic device 801 may identify orientation information and/or a folding state thereof using a sensor (e.g., the sensor circuit 430 of FIG. 4). Orientation information of the electronic device 801 may include a portrait mode (e.g., a state of reference number <810>) and a landscape mode (e.g., a state of reference number <850>). The folding state of the electronic device 801 may include a flat state and a closing state.

For example, a flat state of the electronic device 801 in a portrait mode includes a state in which first side surfaces 821 and 831 of the electronic device 801 are disposed to face in a first direction (e.g., ① direction) and in which second side surfaces 822 and 832 of the electronic device 801 are disposed to face in a second direction (e.g., ② direction) opposite to the first direction (e.g., ① direction), as illustrated in reference number <810>.

For another example, a flat state of the electronic device 801 in the landscape mode includes a state in which a third side surface 823 of the electronic device 801 is disposed to face in the first direction (e.g., ① direction) and in which a fourth side surface 833 of the electronic device 801 is disposed to face in a second direction (e.g., ② direction) opposite to the first direction (e.g., ① direction), as illustrated in reference number <850>.

In various embodiments, the electronic device 801 may include a plurality of audio output devices 841, 843, 845, and 847. The plurality of audio output devices 841, 843, 845, and 847 may be provided in a first housing structure 820 and a second housing structure 830 that rotate around the hinge structure 825 of the electronic device 801. For example, each of the plurality of audio output devices 841, 843, 845, and 847 may be positioned at a side surface (e.g., the first side surfaces 821 and 831 and the second side surfaces 822 and 832) of each housing.

In another embodiment, the plurality of audio output devices 841, 843, 845, and 847 may be positioned at positions corresponding to each other. For example, the first audio output device 841 (e.g., the first audio output device 441 of FIG. 4) is positioned at the first side surface 821 of the first housing structure 820, and the second audio output device 843 (e.g., the third audio output device 445 of FIG. 4) may be positioned at the second side surface 822 of the first housing structure 820 corresponding thereto. The second audio output device 843 (e.g., the second audio output device 443 of FIG. 4) may be positioned at the first side surface 831 of the second housing structure 830 foldable to the first housing structure 820 corresponding to the first audio output device 841 positioned at the first side surface 821 of the first housing structure 820, and the fourth audio output device 847 (e.g., the fourth audio output device 447 of FIG. 4) may be positioned at the second side surface 832 of the second housing structure 830 corresponding thereto.

According to various embodiments, in the case that the electronic device 801 has a foldable type (e.g., in-folding type or out-folding type) form factor, positions of a plurality of audio output devices 841, 843, 845, and 847 disposed in the electronic device 801 are not limited to the above-described embodiment of FIG. 8A.

In various embodiments, a position in which a plurality of audio output devices are disposed when the electronic device 801 is viewed from the front in a portrait mode and a flat state (e.g., reference number <810>) and a position in which the plurality of audio output devices are disposed when the electronic device 801 is viewed from the front in a landscape mode and a flat state (e.g., reference number <850>) may be different.

For example, as illustrated in reference number <810>, when the electronic device 801 is viewed from the front in a portrait mode and a flat state, the first audio output device 841 is disposed at the top left side of the electronic device 801, the second audio output device 843 is disposed at the top right side of the electronic device 801, the third audio output device 845 is disposed at the bottom left side of the electronic device 801, and the fourth audio output device 847 is disposed at the bottom right side of the electronic device 801.

For another example, as illustrated in reference number <850>, when the electronic device 801 is viewed from the front in a landscape mode and a flat state, the first audio output device 841 is disposed at the top right side of the electronic device 801, the second audio output device 843 is disposed at the bottom right side of the electronic device 801, the third audio output device 845 is disposed at the top left side of the electronic device 801, and the fourth audio output device 847 is disposed at the bottom left side of the electronic device 801.

Referring to FIG. 8B, in the case that the electronic device 801 is in a folding state or a closing state, the first housing structure 820 and the second housing structure 830 may be disposed to face each other. When the electronic device 801 is in a folding state, the first audio output device 841 and the third audio output device 845 may be disposed to correspond to each other, and the second audio output device 843 and the fourth audio output device 847 may be disposed to correspond to each other.

In various embodiments, a position in which the plurality of audio output devices are disposed when the electronic device 801 is viewed from the front in a portrait mode and a folding state and a position in which the plurality of audio output devices are disposed when the electronic device 801 is viewed from the front in a landscape mode and a folding state may be different.

For example, when the electronic device 801 is viewed from the front in a portrait mode and a folding state, the first audio output device 841 and the second audio output device 843 are disposed at the upper end of the electronic device 801, and the third audio output device 845 and the fourth audio output device 847 are disposed at the bottom right side of the electronic device 801.

For another example, when the electronic device 801 is viewed from the front in a landscape mode and a folding state, the first audio output device 841 and the second audio output device 843 are disposed at the right side of the electronic device 801, and the third audio output device 845 and the fourth audio output device 847 are disposed at the left side of the electronic device 801.

In various embodiments, the electronic device 801 may transmit channel information of audio data to be finally output from each audio output device 841, 843, 845, or 847 according to orientation information and/or the folding state thereof to each audio output device 841, 843, 845, or 847. For example, when audio data is assumed to two-channel audio data, in order to output audio data of the first channel or the second channel based on orientation information and/or a folding state of the electronic device 801, the electronic device 801 transmits channel information including first channel information or second channel information of audio data to each audio output device 841, 843, 845, or 847.

In relation to an embodiment that transmits channel information of audio data to be finally output by each audio output device 841, 843, 845, or 847 according to the orientation information and/or the folding state of the electronic device 801 according to various embodiments to each audio output device 841, 843, 845, or 847, various embodiments will be described with reference to FIGS. 8A, 8B, and 9 to be described later.

Figure 9:
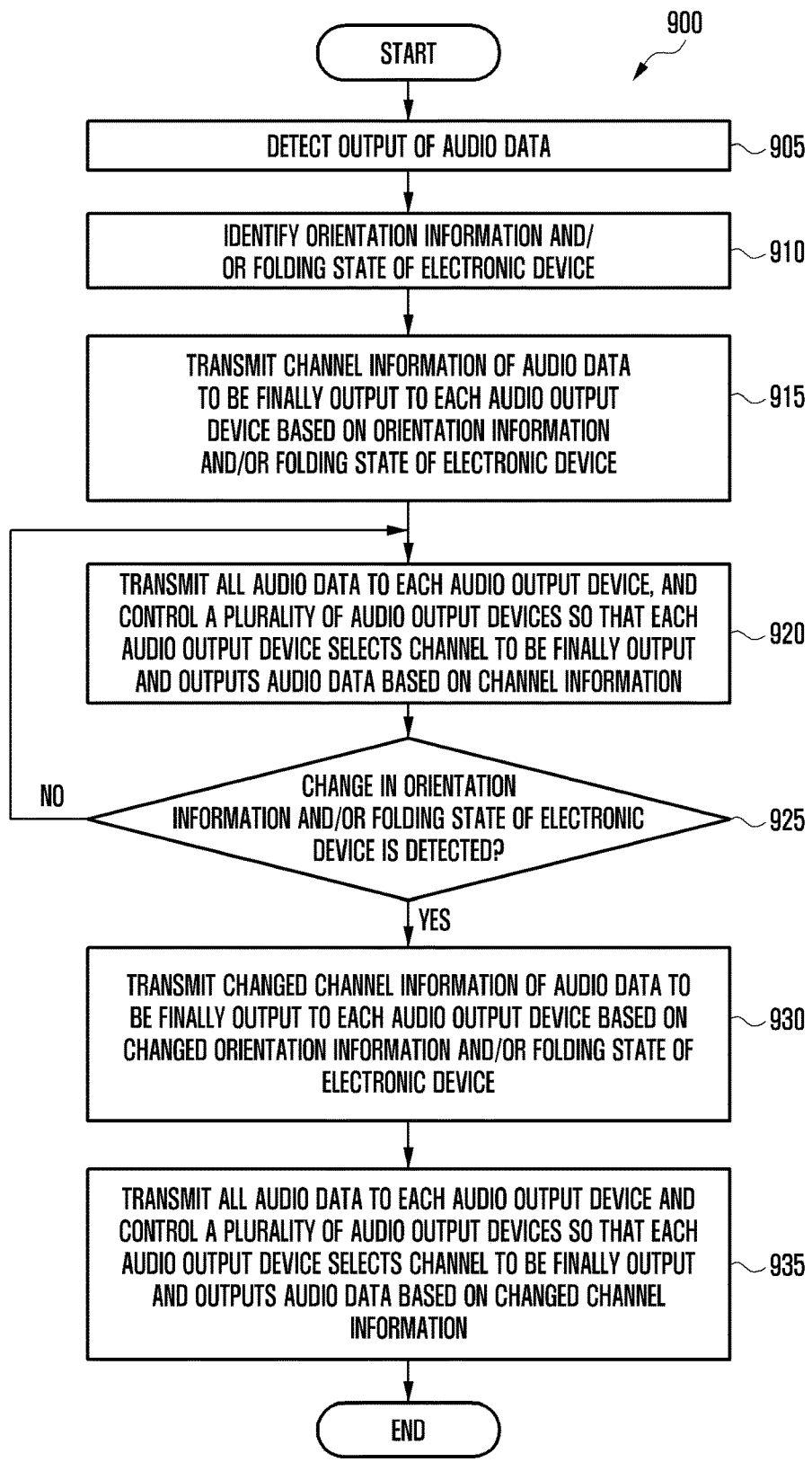
FIG. 9 is a flowchart illustrating a method of outputting multi-channel audio data according to orientation information and/or a folding state of a foldable electronic device according to an embodiment of the disclosure.

FIG. 9 is a flowchart 900 illustrating a method of outputting multi-channel audio data according to orientation information and/or a folding state of the foldable electronic device 801 according to an embodiment of the disclosure.

Referring to FIG. 9, the processor (e.g., the processor 460 of FIG. 4) (e.g., the first processor 460 of FIG. 4) of the electronic device (e.g., the first electronic device 401 of FIG. 4 or the electronic device 801 of FIGS. 8A and 8B) may detect an output of audio data in operation 905. In an embodiment, the processor 460 (e.g., the first processor 461) may process audio data output through a media application (e.g., the media application 511 of FIG. 5A) to generate multi-channel audio data. For example, when multi-channel audio data is assumed to two-channel audio data, for example, the processor 460 may generate audio data into audio data of a first channel (e.g., L channel) and audio data of a second channel (e.g., R channel).

In an embodiment, the processor 460 (e.g., the first processor 461) may transfer the generated audio data of the first channel (e.g., L channel) and audio data of the second channel (e.g., R channel) to the input/output device (e.g., the input/output device 550 of FIG. 5A) (e.g., the second processor 463 of FIG. 4) through the platform layer (e.g., the platform layer 520 of FIG. 5A), the kernel layer (e.g., the kernel layer 530 of FIG. 5A), and the audio layer (e.g., the audio layer 540 of FIG. 5A).

In an embodiment, in operation 910, the processor 460 may identify orientation information and/or a folding state of the electronic device 801. Orientation information of the electronic device 801 may include a portrait mode and a landscape mode. The folding state of the electronic device 801 may include a flat state and a closing state.

In an embodiment, the processor 460 (e.g., the first processor 461) may detect (or identify or determine) a direction in which the first side surface (e.g., the first side surfaces 821 and 831 of FIG. 8A) of the electronic device 801 faces through the sensor circuit (e.g., the sensor circuit 430 of FIG. 4) (e.g., accelerometer sensor, geomagnetic field sensor, and/or gyro sensor) and identify orientation information of the electronic device 801 based on the direction. Further, the processor 460 (e.g., the first processor 461) may identify a folding state (e.g., a flat state, a folding state, or a flat state at a predetermined angle) based on a distance (or angle) between the first housing structure (e.g., the first housing structure 820 of FIGS. 8A and 8B) and the second housing structure (e.g., the second housing structure 830 of FIGS. 8A and 8B) of the electronic device 801 through the sensor circuit 430 (e.g., proximity sensor, infrared (IR) sensor, hall sensor, motion sensor, angle sensor, or illuminance sensor).

In another embodiment, the processor 460 (e.g., the first processor 461) may transmit channel information of audio data to be finally output to each audio output device based on the orientation information and/or the folding state of the electronic device 801 in operation 915. The electronic device 801 may include a plurality of audio output devices. For example, the plurality of audio output devices may include a first audio output device (e.g., the first audio output device 841 of FIG. 8A), a second audio output device (e.g., the second audio output device 843 of FIG. 8A), a third audio output device (e.g., the third audio output device 845 of FIG. 8A), and a fourth audio output device (e.g., the fourth audio output device 847 of FIGS. 8A and 8B).

In various embodiments, as illustrated in FIGS. 8A and 8B, a position in which a plurality of audio output devices are disposed when the electronic device 801 is viewed from the front in a portrait mode and/or a flat (or folding) state and a position in which the plurality of audio output devices are disposed when the electronic device 801 is viewed from the front in a landscape mode and/or a flat state (or a folding state) may be different.

In another embodiment, the processor 460 (e.g., the first processor 461), for example, the control module (e.g., the control module 527 of FIG. 5A) included in the audio HAL (e.g., the audio HAL 525 of FIG. 5A) of the platform layer 520 may transfer control data for controlling the plurality of audio output devices 841, 843, 845, and 847 according to orientation information and/or the folding state of the electronic device 801, for example, channel information of audio data to be output by the plurality of audio output devices 841, 843, 845, and 847 to the input/output device 550 (e.g., the second processor 463).

In various embodiments, channel information of audio data to be finally output from each audio output device 841, 843, 845, or 847 according to a position in which each audio output device 841, 843, 845, or 847 is disposed based on the orientation information and/or the folding state of the electronic device 801 as illustrated in Tables 3 to 6 may be stored in the memory (e.g., the memory 420 of FIG. 4).

TABLE 3

| Audio output device | Flat state and when orientation information of the electronic device is a portrait mode, a position in which the audio output device is disposed | Channel information of audio data to be finally output |
| --- | --- | --- |
| First audio output device 841 | Upper end of first housing | First channel (e.g., L channel) |
| Second audio output device 843 | Upper end of second housing | Second channel (e.g., R channel) |
| Third audio output device 845 | Lower end of first housing | First channel (e.g., L channel) |
| Fourth audio output device 847 | Lower end of second housing | Second channel (e.g., R channel) |

TABLE 4

| Audio output device | Flat state and when orientation information of the electronic device is a landscape mode, a position in which the audio output device is disposed | Channel information of audio data to be finally output |
| --- | --- | --- |
| First audio output device 841 | Right side of first housing | Second channel (e.g., R channel) |
| Second audio output device 843 | Right side of second housing | Second channel (e.g., R channel) |
| Third audio output device 845 | Left side of first housing | First channel (e.g., L channel) |
| Fourth audio output device 847 | Left side of second housing | First channel (e.g., L channel) |

TABLE 5

| Audio output device | Folding state and when orientation information of the electronic device is a portrait mode, a position in which the audio output device is disposed | Channel information of audio data to be finally output |
| --- | --- | --- |
| First audio output device 841 | Upper end of first housing | First channel (e.g., L channel) (or second channel (e.g., R channel)) |
| Second audio output device 843 | Upper end of second housing | First channel (e.g., L channel) (or second channel (e.g., R channel)) |
| Third audio output device 845 | Lower end of first housing | Second channel (e.g., R channel) (or first channel (e.g., L channel)) |
| Fourth audio output device 847 | Lower end of second housing | Second channel (e.g., R channel) (or first channel (e.g., L channel)) |

TABLE 6

| Audio output device | Folding state and when orientation information of the electronic device is a landscape mode, a position in which the audio output device is disposed | Channel information of audio data to be finally output |
| --- | --- | --- |
| First audio output device 841 | Right side of first housing | Second channel (e.g., R channel) (or first channel (e.g., L channel)) |
| Second audio output device 843 | Right side of second housing | Second channel (e.g., R channel) (or first channel (e.g., L channel)) |
| Third audio output device 845 | Left side of first housing | First channel (e.g., L channel) (or second channel (e.g., R channel)) |
| Fourth audio output device 847 | Left side of second housing | First channel (e.g., L channel) (or second channel (e.g., R channel)) |

In another embodiment, the processor 460 (e.g., the second processor 463 of FIG. 4) may transmit all audio data to each audio output device, and control a plurality of audio output devices so that each audio output device selects a channel to be finally output and outputs audio data based on channel information in operation 920. For example, based on channel information (e.g., Table 3, 4, 5, or 6) of audio data to be output by the plurality of audio output devices 841, 843, 845, and 847 received from the control module 527 included in the audio HAL 525, the processor 460 (e.g., the second processor 463) controls each audio output device 841, 843, 845, or 847 to output audio data of a corresponding channel.

For example, in the case that the electronic device 801 is in a portrait mode and a flat state, the processor 460 (e.g., the second processor 463) controls the first audio output device 841 and the third audio output device 845 to output audio data of a first channel, and controls the second audio output device 843 and the fourth audio output device 847 to output audio data of a second channel based on Table 3.

For another example, in the case that the electronic device 801 is in a landscape mode and a flat state, the processor 460 (e.g., the second processor 463) controls the third audio output device 845 and the fourth audio output device 847 to output audio data of a first channel and controls the first audio output device 841 and the second audio output device 843 to output audio data of a second channel based on Table 4.

For another example, in the case that the electronic device 801 is in a portrait mode and a folding state, the processor 460 (e.g., the second processor 463) controls the first audio output device 841 and the second audio output device 843 to output audio data of the first channel (or the second channel)

and controls the third audio output device 845 and the fourth audio output device 847 to output audio data of the second channel (or the first channel) based on Table 5.

For another example, in the case that the electronic device 801 is in a landscape mode and a folding state, the processor 460 (e.g., the second processor 463) controls the third audio output device 845 and the fourth audio output device 847 to output audio data of the first channel (or second channel), and controls the first audio output device 841 and the second audio output device 843 to output audio data of the second channel (or the first channel) based on Table 6.

The disclosure is not limited thereto, and in the case that the electronic device 801 is in a landscape mode and a folding state, the processor 460 (e.g., the second processor 463) may control to output audio data of the first channel (e.g., L channel) (or the second channel (e.g., R channel)) to one audio output device of the third audio output device 845 and the fourth audio output device 847, and control the other audio output device to turn off. In the case that the electronic device 801 is in a landscape mode and a folding state, the processor 460 (e.g., the second processor 463) may control to output audio data of the second channel (e.g., R channel) (or the first channel (e.g., L channel)) to one audio output device of the first audio output device 841 and the second audio output device 843 and control the other audio output device to turn off.

Channel information of audio data to be finally output by each audio output device according to Table 3 to Table 6 according to various embodiments is an embodiment, but the disclosure is not limited thereto.

In another embodiment, the processor 460 (e.g., the first processor 461) may identify whether a change in orientation information and/or the folding state of the electronic device 801 is detected in operation 925. For example, the change of orientation information of the electronic device 801 includes a change from a portrait mode to a landscape mode and a change from a landscape mode to a portrait mode. The change of the folding state of the electronic device 801 may include a change from a flat state to a folding state and a change from a folding state to a flat state.

In another embodiment, if a change in the orientation information and/or the folding state of the electronic device 801 is not detected (e.g., NO in operation 925), the processor 460 (e.g., the first processor 461) may continue to perform operation 925.

In another embodiment, when a change in orientation information and/or the folding state of the electronic device 801 is detected (e.g., YES in operation 925), the processor 460 (e.g., the first processor 461) may transmit changed channel information of audio data to be finally output to each audio output device based on the changed orientation information and/or folding state of the electronic device 801 in operation 930. For example, in the case that the orientation information and/or the folding state of the electronic device 801 is changed, position information in which a plurality of audio output devices 841, 843, 845, and 847 are disposed when the electronic device 801 is viewed from the front is also changed, and accordingly, channel information of audio data to be finally output is also changed.

In another embodiment, the processor 460 (e.g., the first processor 461), for example, the control module 527 included in the audio HAL 525 of the platform layer 520 may transfer changed control data for controlling the plurality of audio output devices 841, 843, 845, and 847 according to the changed orientation information and/or folding state of the electronic device 801, for example, changed channel information of audio data to be output by the plurality of audio output devices 841, 843, 845, and 847 to the input/output device 550 (e.g., the second processor 463).

In another embodiment, in operation 935, the processor 460 may transmit all audio data to each audio output device and control the plurality of audio output devices so that each audio output device selects a channel to be finally output and outputs audio data based on the changed channel information. For example, the processor 460 (e.g., the second processor 463) may control the plurality of audio output devices 841, 843, 845, and 847 so that each audio output device 841 and 843, 845, or 847 outputs audio data of a corresponding channel based on the changed channel information (e.g., Table 3 to Table 6) of audio data to be output by the plurality of audio output devices 841, 843, 845, and 847 according to the change orientation information and/or folding state of the electronic device 801 received from the control module 527 included in the audio HAL 525.

A method of outputting multi-channel audio of an electronic device 401 according to various embodiments may include identifying orientation information of the electronic device 401 based on detecting an output of audio data; transmitting channel information of audio data to be output by each of a plurality of audio output devices (e.g., a first audio output device 441, a second audio output device 443, a third audio output device 445, and a fourth audio output device 447) to each audio output device based on orientation information of the electronic device 401; and controlling the plurality of audio output devices (e.g., the first audio output device 441, the second audio output device 443, the third audio output device 445, and the fourth audio output device 447) so that the each audio output device selects a channel and outputs audio data of the selected channel based on the channel information.

The method of outputting multi-channel audio of the electronic device 401 according to various embodiments may further include generating the audio data into multi-channel audio data based on detecting the output of the audio data.

In various embodiments, the multi-channel audio data may include audio data of a first channel and audio data of a second channel.

Controlling the plurality of audio output devices (e.g., the first audio output device 441, the second audio output device 443, the third audio output device 445, and the fourth audio output device 447) according to various embodiments may include controlling at least some audio output devices to output audio data of the first channel among the multi-channel audio data through the at least some audio output devices among the plurality of audio output devices; and controlling at least some other audio output devices to output audio data of the second channel among the multi-channel audio data through the at least some other audio output devices among the plurality of audio output devices based on the channel information of the audio data.

A method of outputting multi-channel audio of an electronic device 401 according to various embodiments may further include transmitting changed channel information of audio data to be output by the each audio output device according to the changed orientation information to the each audio output device based on detecting a change in orientation information of the electronic device 401; and controlling the plurality of audio output devices (e.g., the first audio output device 441, the second audio output device 443, the third audio output device 445, and the fourth audio output device 447) so that the each audio output device selects a channel and outputs audio data of the selected channel based on the changed channel information.

Based on the changed channel information according to various embodiments, controlling the plurality of audio output devices (e.g., the first audio output device 441, the second audio output device 443, the third audio output device 445, and the fourth audio output device 447) may include controlling at least some audio output devices to output audio data of the second channel among the multi-channel audio data through the at least some audio output devices among the plurality of audio output devices based on the changed channel information of the audio data; and controlling at least some other audio output devices to output audio data of the first channel among the multi-channel audio data through the at least some audio output devices among the plurality of audio output devices.

In various embodiments, the electronic device 401 is a foldable electronic device (e.g., the electronic device 401 of FIG. 4 or the electronic device 801 of FIGS. 8A and 8B), and a method of outputting multi-channel audio of the electronic device may further include identifying a folding state of the electronic device 801 based on detecting the output of the audio data.

A method of outputting multi-channel audio of an electronic device 401 according to various embodiments may further include transmitting second channel information of audio data to be output by each of a plurality of audio output devices to the each audio output device based on orientation information and/or the folding state of the electronic device 401; and controlling a plurality of audio output devices (e.g., the first audio output device 441, the second audio output device 443, the third audio output device 445, and the fourth audio output device 447) so that the each audio output device selects a channel and outputs audio data of the selected channel based on the second channel information.

In various embodiments, transmitting channel information of the audio data to each audio output device may include transmitting channel information of audio data to be output by each of the plurality of audio output devices (e.g., the first audio output device 441, the second audio output device 443, the third audio output device 445, and the fourth audio output device 447) by the first processor 461 of the electronic device 401 to the second processor 463 of the electronic device 401.

In various embodiments, controlling the plurality of audio output devices (e.g., the first audio output device 441, the second audio output device 443, the third audio output device 445, and the fourth audio output device 447) may include outputting audio data of a channel configured to the each audio output device based on the channel information by controlling the plurality of audio output devices by the second processor 463.

In various embodiments, the orientation information of the electronic device 401 may include a portrait mode and a landscape mode, and the folding state of the electronic device 401 or 801 may include a flat state and a folding state of the electronic device 401 or 801.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
memory storing one or more computer programs;
a plurality of audio output devices; and
one or more processors communicatively coupled to the memory and the plurality of audio output devices,
wherein the one or more computer programs include computer-executable instructions that, when executed by the one or more processors individually or collectively, cause the electronic device to:
identify orientation information of the electronic device,
transmit channel information of all of audio data to be output by each of the plurality of audio output devices to each audio output device of the plurality of audio output devices based on the orientation information of the electronic device, and
control the plurality of audio output devices so that each audio output device of the plurality of audio output devices selects a channel from among the channel information of all of the audio data to be output and outputs audio data of the selected channel based on the channel information.

2. The electronic device of claim 1,
wherein the one or more computer programs further include computer-executable instructions that, when executed by the one or more processors individually or collectively, cause the electronic device to:
generate the audio data into multi-channel audio data, and
transfer the multi-channel audio data to the plurality of audio output devices, and
wherein the multi-channel audio data comprises audio data of a first channel and audio data of a second channel.

3. The electronic device of claim 2, wherein the one or more computer programs further include computer-executable instructions that, when executed by the one or more processors individually or collectively, is cause the electronic device to:
control at least some audio output devices to output audio data of the first channel among the multi-channel audio data through the at least some audio output devices among the plurality of audio output devices based on the channel information of the audio data, and
control at least some other audio output devices to output audio data of the second channel among the multi-channel audio data through the at least some other audio output devices among the plurality of audio output devices.

4. The electronic device of claim 3, wherein the one or more computer programs further include computer-executable instructions that, when executed by the one or more processors individually or collectively, cause the electronic device to:
transmit changed channel information of audio data to be output by each audio output device of the plurality of audio output devices according to changed orientation information to each audio output device of the plurality of audio output devices based on detecting a change in orientation information of the electronic device, and
control the plurality of audio output devices so that each audio output device of the plurality of audio output devices selects a channel and outputs audio data of the selected channel based on the changed channel information.

5. The electronic device of claim 4, wherein the one or more computer programs further include computer-executable instructions that, when executed by the one or more processors individually or collectively, cause the electronic device to:
control at least some audio output devices of the plurality of audio output devices to output audio data of the second channel among the multi-channel audio data through the at least some audio output devices among the plurality of audio output devices based on the changed channel information of the audio data, and
control the at least some other audio output devices to output audio data of the first channel among the multi-channel audio data through the at least some other audio output devices among the plurality of audio output devices.

6. The electronic device of claim 1, wherein the electronic device is a foldable electronic device.

7. The electronic device of claim 6, wherein the one or more computer programs further include computer-executable instructions that, when executed by the one or more processors individually or collectively, cause the electronic device to:
identify a folding state of the foldable electronic device.

8. The electronic device of claim 7, wherein the one or more computer programs further include computer-executable instructions that, when executed by the one or more processors individually or collectively, cause the electronic device to:
transmit second channel information of audio data to be output by each of the plurality of audio output devices to each audio output device of the plurality of audio output devices based on at least one of orientation information or the folding state of the electronic device, and
control the plurality of audio output devices so that each audio output device of the plurality of audio output devices selects a channel and outputs audio data of the selected channel based on the second channel information.

9. The electronic device of claim 1,
wherein the one or more processors comprises a first processor and a second processor,
wherein the first processor is configured to transmit the channel information of all of the audio data to be output by each of the plurality of audio output devices to the second processor based on the orientation information of the electronic device, and
wherein the second processor is configured to control the plurality of audio output devices to output audio data of a channel configured to each audio output device of the plurality of audio output devices based on the channel information.

10. The electronic device of claim 9, wherein the second processor is configured to be included in each of the plurality of audio output devices.

11. The electronic device of claim 8,
wherein the orientation information of the electronic device comprises a portrait mode and a landscape mode, and
wherein the folding state of the electronic device comprises a flat state and a folding state of the electronic device.

12. A method performed by an electronic device for outputting multi-channel audio, the method comprising:
identifying, by the electronic device, orientation information of the electronic device;
transmitting, by the electronic device, channel information of all of audio data to be output by each of a plurality of audio output devices to each audio output device based on the orientation information of the electronic device; and
controlling, by the electronic device, the plurality of audio output devices so that each audio output device of the plurality of audio output devices selects a channel from among the channel information of all of the audio data to be output and outputs audio data of the selected channel based on the channel information.

13. The method of claim 12, further comprising:
generating, by the electronic device, the audio data into multi-channel audio data,
wherein the multi-channel audio data comprises audio data of a first channel and audio data of a second channel.

14. The method of claim 13, wherein the controlling of the plurality of audio output devices comprises:
controlling, by the electronic device, at least some audio output devices of the plurality of audio output devices to output audio data of the first channel among the multi-channel audio data through the at least some audio output devices among the plurality of audio output devices based on the channel information of all of the audio data; and
controlling, by the electronic device, at least some other audio output devices to output audio data of the second channel among the multi-channel audio data through the at least some other audio output devices among the plurality of audio output devices.

15. The method of claim 14, further comprising:
transmitting, by the electronic device, changed channel information of audio data to be output by each audio output device of the plurality of audio output devices according to changed orientation information to each audio output device of the plurality of audio output devices based on detecting a change in orientation information of the electronic device; and
controlling, by the electronic device, the plurality of audio output devices so that each audio output device of the plurality of audio output devices selects a channel and outputs audio data of the selected channel based on the changed channel information.

16. The method of claim 15, wherein the controlling of the plurality of audio output devices based on the changed channel information comprises:
controlling, by the electronic device, at least some audio output devices to output audio data of the second channel among the multi-channel audio data through the at least some audio output devices among the plurality of audio output devices based on the changed channel information of the audio data; and
controlling, by the electronic device, at least some other audio output devices to output audio data of the first channel among the multi-channel audio data through the at least some other audio output devices among the plurality of audio output devices.

17. The method of claim 12,
wherein the electronic device comprises a foldable electronic device, and
wherein the method further comprises:
identifying, by the electronic device, a folding state of the electronic device.

18. The method of claim 17, further comprising:
transmitting, by the electronic device, second channel information of audio data to be output by each of the plurality of audio output devices to each audio output device of the plurality of audio output devices based on at least one of orientation information or the folding state of the electronic device; and
controlling, by the electronic device, the plurality of audio output devices so that each audio output device of the plurality of audio output devices selects a channel and outputs audio data of the selected channel based on the second channel information.

19. The method of claim 12,
wherein the transmitting of the channel information to each audio output device comprises:
transmitting, by a first processor of the electronic device, the channel information of all of the audio data to be output by each of the plurality of audio output devices to a second processor of the electronic device, and
wherein the controlling of the plurality of audio output devices comprises:
outputting, by the second processor, the audio data of a channel configured to each audio output device of the plurality of audio output devices based on the channel information by controlling the plurality of audio output devices.

20. The method of claim 17,
wherein the orientation information of the electronic device comprises a portrait mode and a landscape mode, and
wherein the folding state of the electronic device comprises a flat state and a folding state of the electronic device.

* * * * *